US012678937B2

(12) United States Patent
Asato et al.

(10) Patent No.: US 12,678,937 B2
(45) Date of Patent: Jul. 14, 2026

(54) TEACHING SYSTEM, ROBOT SYSTEM, ROBOT TEACHING METHOD, AND ROBOT TEACHING PROGRAM

(71) Applicant: KAWASAKI JUKOGYO KABUSHIKI KAISHA, Kobe (JP)

(72) Inventors: Tatsutoshi Asato, Kobe (JP); Yoshiki Naito, Kobe (JP); Yuma Ishi, Kobe (JP); Fumihiro Nakagawa, Akashi (JP); Shingo Mukai, Akashi (JP); Takayuki Yoshimura, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 18/717,497

(22) PCT Filed: Dec. 7, 2022

(86) PCT No.: PCT/JP2022/045192
§ 371 (c)(1),
(2) Date: Jun. 7, 2024

(87) PCT Pub. No.: WO2023/106353
PCT Pub. Date: Jun. 15, 2023

(65) Prior Publication Data
US 2025/0042018 A1     Feb. 6, 2025

(30) Foreign Application Priority Data
Dec. 7, 2021     (JP) ................................. 2021-198813

(51) Int. Cl.
B25J 9/16        (2006.01)
B25J 9/00        (2006.01)

(52) U.S. Cl.
CPC ........... B25J 9/0081 (2013.01); B25J 9/1671 (2013.01); B25J 9/1697 (2013.01)

(58) Field of Classification Search
CPC ...... B25J 9/0081; B25J 9/1671; B25J 9/1656; B25J 9/1697; B25J 13/06; G05B 19/42
See application file for complete search history.

(56) References Cited

U.S. PATENT DOCUMENTS 10,048,851 B2 *    8/2018   Yui ...................... G06F 3/04883
11,241,759 B2 *    2/2022   Takeda ................... B25J 9/1671
(Continued)

FOREIGN PATENT DOCUMENTS

JP          2001-216015 A        8/2001
JP          2014-079824 A        5/2014
(Continued)

OTHER PUBLICATIONS

Feb. 21, 2023 International Search Report issued in International Patent Application No. PCT/JP2022/045192.

*Primary Examiner* — Dalena Tran
(74) *Attorney, Agent, or Firm* — Oliff PLC

(57) ABSTRACT

A teaching system includes a teaching point generator that generates a teaching point of a robot; an operator that is operated by a user; an image generator that generates a VR image in which a virtual robot corresponding to the robot is placed in a VR space; and a display that displays the VR image. The image generator generates the VR image in which the virtual robot moves in accordance with operation to the operator. The teaching point generator generates a teaching point corresponding to a position of the virtual robot in the VR space generated by the image generator.

18 Claims, 13 Drawing Sheets

(56) References Cited

U.S. PATENT DOCUMENTS

| | | | |
|---|---|---|---|
| 2013/0060369 A1* | 3/2013 | Simard ............. | G05B 19/4083 |
| | | | 700/98 |
| 2014/0135986 A1* | 5/2014 | Kanehara ............... | B25J 9/1671 |
| | | | 700/257 |
| 2014/0220249 A1* | 8/2014 | Rouaud .................. | B05B 12/02 |
| | | | 427/256 |
| 2015/0112482 A1 | 4/2015 | Kuwahara | |
| 2019/0321983 A1 | 10/2019 | Chen et al. | |
| 2019/0329411 A1 | 10/2019 | Atohira | |
| 2022/0266449 A1 | 8/2022 | Hasegawa et al. | |

FOREIGN PATENT DOCUMENTS

| | | |
|---|---|---|
| JP | 2015-077661 A | 4/2015 |
| JP | 2018-036720 A | 3/2018 |
| JP | 2019-188477 A | 10/2019 |
| JP | 2019-188531 A | 10/2019 |
| WO | 2021/024586 A1 | 2/2021 |

* cited by examiner

88

83

84a

87

81

80a

80b

82

89

80

4

44 — TRACKING CONTROLLER

45 — IMAGE GENERATOR

46 — MOTION GENERATOR

47 — GENERATION PROCESSOR

2

23 — ROTATION ANGLE GENERATOR

24 — TEACHING POINT GENERATOR

25 — TEACHING DATA GENERATOR

26 — ROBOT CONTROLLER

FIRST TEACHING MODE     FIG. 7

SECOND TEACHING MODE     FIG. 11

PLAYBACK MODE

START

S301 — START TRACKING

S302 — ACQUIRE TEACHING DATA

S303 — START VR IMAGE GENERATION/ DISPLAY FOR PLAYBACK MODE

END

TEACHING SYSTEM, ROBOT SYSTEM, ROBOT TEACHING METHOD, AND ROBOT TEACHING PROGRAM

FIELD

The technique disclosed here relates to a teaching system, a robot system, a robot teaching method, and a robot teaching program.

BACKGROUND

Patent Document 1 discloses a teaching apparatus that extracts a movement path of a workpiece from an image obtained by a camera and converts the extracted movement path to a movement path of a robot.

CITATION LIST

Patent Document

Patent Document 1: Japanese Patent Application Publication No. 2019-188477

SUMMARY

With the teaching apparatus described above, since a user is located away from the robot, it is difficult for the user to observe a motion of the robot. Thus, it is sometimes difficult to appropriately generate teaching points of the robot.

It is therefore an object of the technique disclosed here to appropriately generate teaching points of a robot.

A teaching system disclosed here includes: a teaching point generator that generates a teaching point of a robot; an operator that is operated by a user; an image generator that generates a virtual image in which a virtual robot corresponding to the robot is placed in a virtual space; and a display that displays the virtual image, wherein the image generator generates the virtual image in which the virtual robot moves in accordance with operation to the operator, and the teaching point generator generates the teaching point corresponding to a position of the virtual robot in the virtual space generated by the image generator.

A teaching system disclosed here includes: a teaching point generator that generates a teaching point of a robot; an image generator that generates a virtual image in which a virtual robot corresponding to the robot is placed in a virtual space; and a display that displays the virtual image, wherein the image generator generates the virtual image in which the virtual robot moves in accordance with the teaching point generated by the teaching point generator.

A robot system disclosed here includes: the teaching system; and a robot that moves in accordance with the teaching point generated by the teaching point generator.

A teaching method for a robot disclosed here includes: generating a virtual image in which a virtual robot corresponding to the robot is placed in a virtual space; displaying the virtual image; moving the virtual robot in the virtual image in accordance with operation from a user to an operator for moving the virtual robot; and generating a teaching point of the robot corresponding to a position of the virtual robot in the virtual space.

A teaching program for a robot disclosed here causes a computer to perform the functions of: generating a virtual image in which a virtual robot corresponding to the robot is placed in a virtual space; moving the virtual robot in the virtual image in accordance with operation from a user to an operator for moving the virtual robot; and generating a teaching point of the robot corresponding to a position of the virtual robot in the virtual space.

With the teaching system, teaching points of the robot can be appropriately generated.

With the robot system, teaching points of the robot can be appropriately generated.

With the robot teaching method, teaching points of the robot can be appropriately generated.

With the robot teaching program, teaching points of the robot can be appropriately generated.

DESCRIPTION OF EMBODIMENTS

Figure 1:
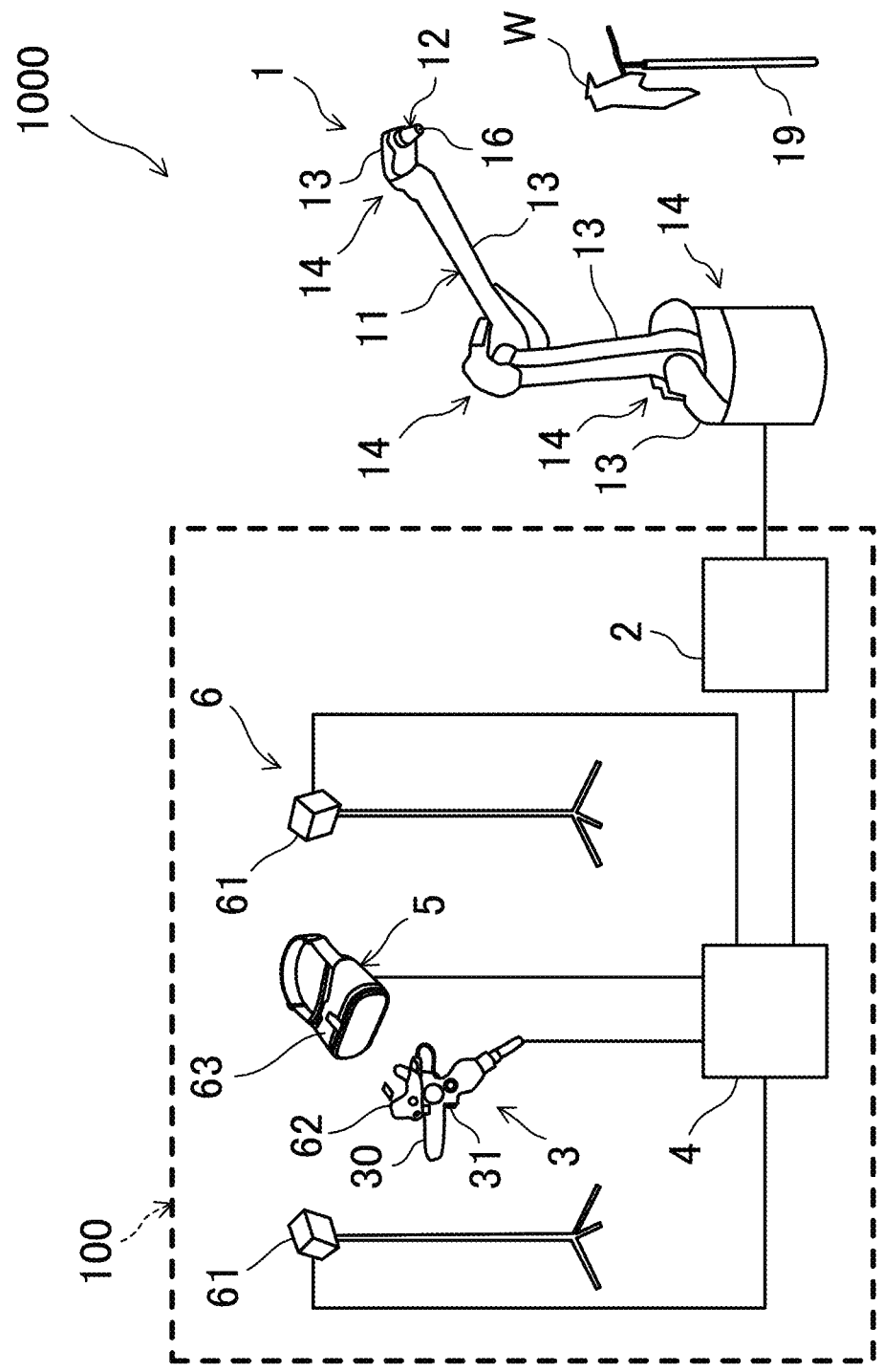
FIG. 1 illustrates a schematic configuration of a robot system.

An exemplary embodiment will be described in detail hereinafter with reference to the drawings. FIG. 1 illustrates a schematic configuration of a robot system 1000.

The robot system 1000 includes a robot 1 and a teaching system 100. The teaching system 100 creates teaching data of the robot 1. The robot 1 and the teaching system 100 are connected to each other to enable signal transmission therebetween.

The robot 1 is an industrial robot. The robot 1 flexibly moves or transforms. The robot 1 performs a treatment on a workpiece W. The workpiece W is located relative to the robot 1. For example, the treatment performed by the robot 1 is a process treatment of processing the workpiece W. Specifically, the process treatment is a treatment of injecting a predetermined injection object toward the workpiece W. The process treatment of this example is coating of injecting paint toward the workpiece W. The paint is an example of the injection object.

The robot 1 includes a manipulator. Specifically, the robot 1 includes an articulated robot arm 11 and an end effector 12 coupled to the robot arm 11. The end effector 12 is an example of a tool. The robot arm 11 moves or transforms to thereby change the position and posture of the end effector 12. In the robot 1, a predetermined robot coordinate system is set. The positions and postures of the robot arm 11 and the end effector 12 in the robot coordinate system are controlled so that the robot arm 11 thereby moves or transforms, and accordingly, the position and posture of the end effector 12 change.

The robot arm 11 is, for example, a vertical articulated arm. Specifically, the robot arm 11 includes links 13, joints 14, and motors 15 (see FIG. 4). Each of the joints 14 of the robot arm 11 rotatably connects adjacent two of the links 13. Each of the motors 15 rotationally drives a corresponding one of the joints 14. The motors 15 are, for example, servo motors. The robot arm 11 moves with driving of the motors 15 to move or transform. With the movement of the robot arm 11, the position and other characteristics of the end effector 12 change.

The end effector 12 performs a treatment on a workpiece W. In this example, the end effector 12 injects an injection object toward the workpiece W. Specifically, the end effector 12 is a coater that injects paint to the workpiece W that is a target to be coated. The end effector 12 includes an injection port 16 from which paint is injected toward a predetermined injection axis.

The teaching system 100 includes a teaching point generator 2 that generates a teaching point of the robot 1, an operator 3 that is operated by a user as a teacher, an image generator 4 that generates a virtual image 8 in which a virtual robot 81 corresponding to the robot 1 is placed in a virtual space 80, and a display 5 that displays the virtual image 8. The image generator 4 generates the virtual image 8 in which the virtual robot 81 moves in accordance with operation of the operator 3 by the user. The teaching point generator 2 generates a teaching point corresponding to a position of the virtual robot 81 in the virtual space 80 generated by the image generator 4. The teaching point generator 2 also generates teaching data based on the generated teaching point.

Specifically, the teaching system 100 uses a virtual technique, that is, a cross reality (XR) technique, to move the virtual robot 81 in the virtual space 80 and generate a virtual teaching point in the virtual space 80 and to generate a teaching point in a real space corresponding to the virtual teaching point. Based on the generated teaching point, the teaching system 100 creates teaching data of the robot 1. The XR includes virtual reality (VR), augmented reality (AR), mixed reality (MR), and substitutional reality (SR). In this example, the teaching system uses the VR technique. The virtual space will also be referred to as a "VR space." The virtual image will also be referred to as a "VR image."

In this example, the teaching system 100 creates teaching points, and further teaching data, for causing the robot 1 to perform coating. The robot 1 injects paint from the end effector 12 toward the workpiece W to perform coating, while changing the position and posture of the end effector 12 by moving the robot arm 11 in accordance with the teaching data.

In the teaching system 100, the teaching point generator 2 and the image generator 4 are connected to each other to enable signal transmission therebetween. The operator 3 and the display 5 are connected to the image generator 4 to enable signal transmission therebetween.

The operator 3 is used to perform movement and other operations of the virtual robot 81 in the virtual space 80. The operator 3 is a portable device and is, for example, held by a user with hand. The operator 3 includes an operator body 30 and an operation device 31 that receives an input from the user.

The operator body 30 is shaped such that the user can hold the operator body 30. The operation device 31 is located at the operator body 30. The operator body 30 may have a shape simulating an injection gun that can be held by the user. The user has an image of holding an injection gun when holding the operator body 30 in a preparation stage. Accordingly, in generating a teaching point, the user operates the operator 3 while seeing an VR image 8 displayed on the display 5, and operates the operator 3 with a sense of holding an injection gun. When the operation device 31 is operated by the user, the operation device 31 outputs a corresponding operation signal. The operator 3 outputs the operation signal from the operation device 31 to the image generator 4. The operation signal is used for generating a VR image 8 by the image generator 4.

The display 5 displays the VR image 8 generated by the image generator 4. The VR image 8 generated by the image generator 4 is input to the display 5. The display 5 is mounted to the head of the user. For example, the display 5 is a head mounted display (HMD). The HMD may be a goggle-shaped device dedicated to VR and having a display or may be used by attaching a mobile terminal such as a smartphone to a holder that is mountable to the head.

The teaching system 100 further includes a tracking system 6 that detects the position and posture of the operator 3 in a real space and the position and posture of the display 5 in the real space. The tracking system 6 includes a plurality of (e.g., two) light emitters 61, a first sensor 62 included in the operator 3, a second sensor 63 included in the display 5, and the image generator 4 serving as a calculator that calculates positions of the operator 3 and the display 5 from detection results of the first sensor 62 and the second sensor 63. The tracking system 6 is an outside-in tracking system. The light emitters 61, the first sensor 62, and the second sensor 63 are connected to the image generator 4 to enable signal transmission therebetween. The tracking system 6 detects the positions and postures of the first sensor 62 and the second sensor 63 in an operating area where the user can move in the real space. In the operating area, a predetermined operation coordinate system is set. The tracking system 6 detects the positions and postures of the first sensor 62 and the second sensor 63 in the operation coordinate system. The tracking system 6 is an example of an operator sensor that detects the position and posture of the operator in the real space.

The operation coordinate system of the tracking system 6 corresponds to a VR coordinate system set in the VR space 80. The operation coordinate system of the tracking system 6 also corresponds to the robot coordinate system of the robot 1. In addition, the VR coordinate system of the VR space 80 also corresponds to the robot coordinate system of the robot 1. That is, the robot coordinate system, the operation coordinate system, and the VR coordinate system correspond to one another. For example, when a position in the operation coordinate system is determined, a position in the robot coordinate system and a position of the VR coordinate system are uniquely determined.

The light emitters 61 apply light to the real space. For example, the light emitters 61 are infrared lasers that scan the real space with infrared laser light. The light emitters 61 perform scanning with laser light in the longitudinal direction and the transverse direction while intermittently applying laser light. Application information of laser light from the light emitters 61 is input to the image generator 4.

The first sensor 62 and the second sensor 63 are sensors that detects light, and are, for example, infrared sensors. Detection results of the first sensor 62 and the second sensor 63 are input to the image generator 4.

When the first sensor 62 detects laser light, the image generator 4 obtains the position and posture of the operator 3 in the real space based on the travel time of laser light from the light emitters 61 to the first sensor 62 and information on laser light application from the light emitters 61 (e.g., direction in which laser light is applied in the real space). Similarly, when the second sensor 63 detects laser light, the image generator 4 also obtains the position and posture of the display 5 in the real space. The image generator 4 regards the position and posture of the display 5 in the real space as the position and the direction of the line of sight of the user, respectively, in the real space.

In this example, the image generator 4 functions as a calculator of the tracking system 6. Alternatively, the calculator may not be included in the image generator 4.

From the position and direction of the line of sight of the user and the position and posture of the operator 3 in the real space, the image generator 4 obtains the position and direction of the line of sight of the user and the position and posture of the operator 3 in the VR space 80. That is, the image generator 4 converts the position and direction of the line of sight of the user and the position and posture of the operator 3 in the operation coordinate system to the position and direction of the line of sight of the user and the position and posture of the operator 3 in the VR coordinate system.

Figure 2:
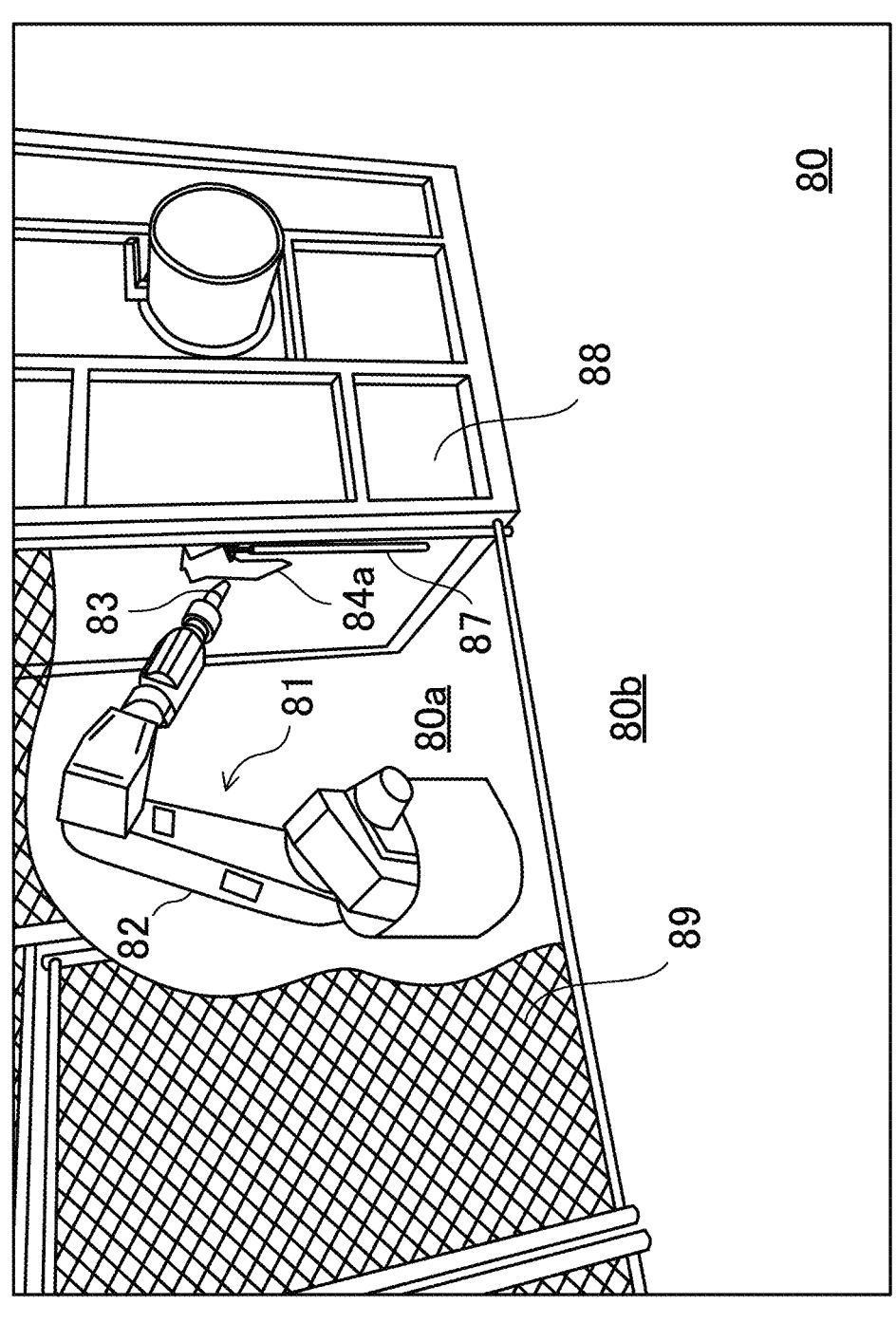
FIG. 2 illustrates an example of a VR space.
Figure 3:
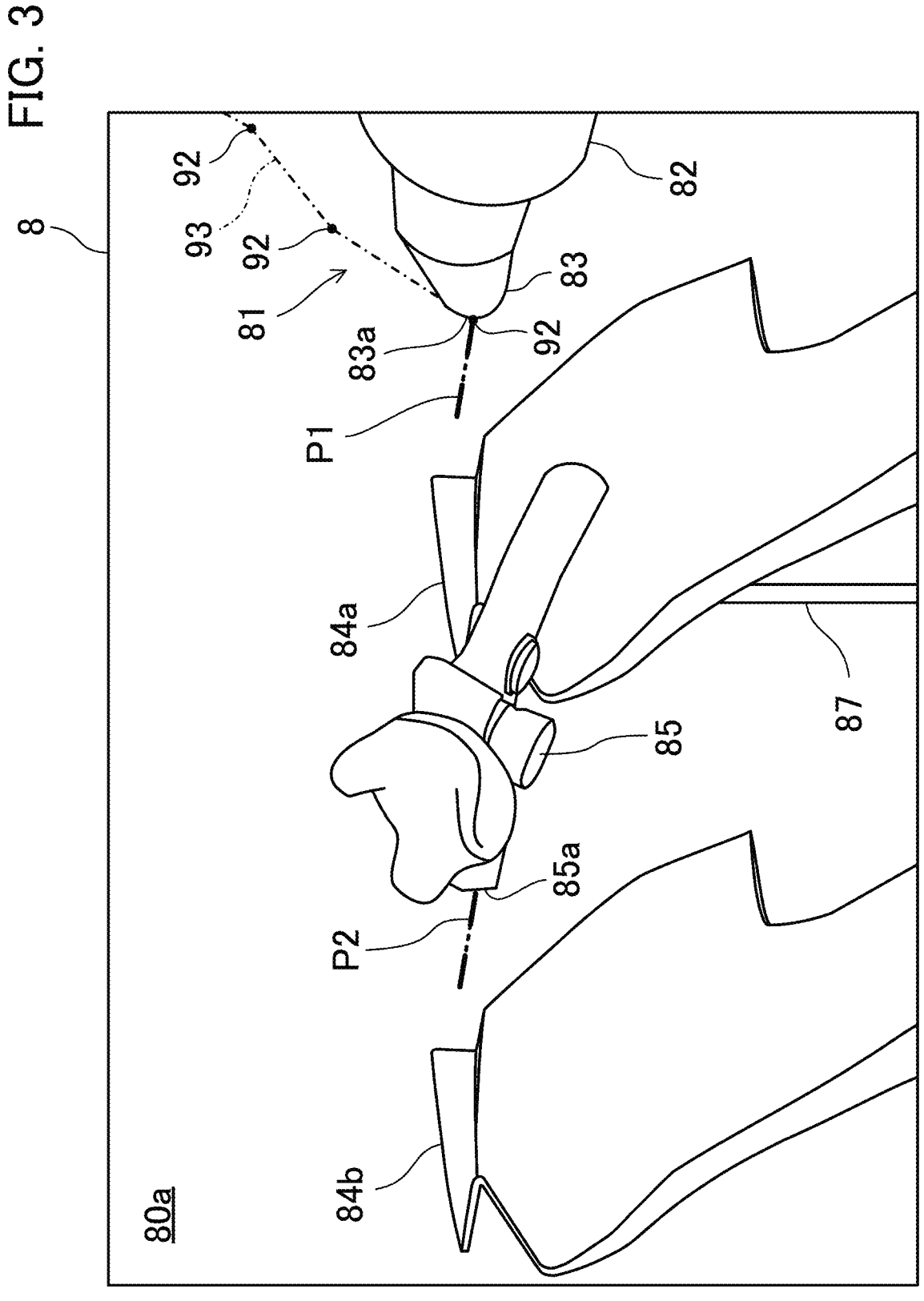
FIG. 3 is an example of a VR image.

The image generator 4 generates the VR image 8 in which the virtual robot 81 corresponding to the robot 1 and a first virtual workpiece 84a corresponding to the workpiece W are located in the VR space 80. FIG. 2 illustrates an example of the VR space 80. FIG. 3 is an example of the VR image 8. The VR image 8 in FIG. 3 is a first-person perspective image expressed from the user's viewpoint. The image generator 4 generates the VR image 8 in which the virtual robot 81 moves and performs a treatment on the first virtual workpiece 84a in the VR space 80. The image generator 4 generates the VR image 8 in accordance with the position and direction of the line of sight of the user in the VR space 80, and transmits the generated VR image 8 to the display 5.

Specifically, as illustrated in FIG. 2, a virtual supporter 87, a virtual booth 88, a virtual fence 89, and so forth are placed in the VR space 80. The virtual supporter 87, the virtual booth 88, and the virtual fence 89 are example of virtual facilities corresponding to facilities around the robot 1 in the real space. Thus, in some line of sight of the user, the VR image 8 can include the virtual supporter 87, the virtual booth 88, the virtual fence 89, or other objects.

The virtual supporter 87 is an object in the VR space 80 corresponding to a supporter 19 (see FIG. 1) supporting a workpiece W in the real space. The virtual booth 88 is an object in the VR space 80 corresponding to a coating booth in which the workpiece W is placed and coating work is performed in the real space. The virtual fence 89 is an object in the VR space 80 corresponding to a safety fence surrounding the robot 1 in the real space. A relative positional relationship among the virtual robot 81, the virtual supporter 87, the virtual booth 88, and the virtual fence 89 in the VR space 80 coincides with a relative positional relationship among the robot 1, the supporter 19, the coating booth, and the safety fence in the real space.

A first region 80a that is a region inside the virtual fence 89 includes at least a movable range of the virtual robot 81. A second region 80b that is a region outside the virtual fence 89 is a safety region in which the virtual robot 81 does not move.

The virtual robot 81 and the first virtual workpiece 84a are located in the first region 80a. Specifically, the virtual robot 81 is located within the virtual fence 89. The virtual robot 81 includes a virtual arm 82 corresponding to the robot arm 11 and a virtual end effector 83 corresponding to the end effector 12. The virtual end effector 83 is an example of a virtual tool. The first virtual workpiece 84a is located in the virtual booth 88. A relative positional relationship between the first virtual workpiece 84a and the virtual end effector 83 in the VR space 80 coincides with a relative positional relationship between the workpiece W and the end effector 12 in the real space.

The image generator 4 extracts a portion of the VR space 80 as the VR image 8, in accordance with the line of sight of the user. In this example, the image generator 4 generates the VR image 8 in accordance with the position and posture of the display 5. At this time, the image generator 4 performs various displays in accordance with settings. For example, FIG. 3 shows a VR image 8 in a state close to the virtual end effector 83 and the first virtual workpiece 84a. In this example, a virtual operator 85 corresponding to the operator 3 and a second virtual workpiece 84b for simulating a treatment of the robot 1 by the virtual operator 85 are also placed in the VR space 80. The image generator 4 may perform various additional displays. Examples of the additional displays may include display for assisting teaching operation and virtual display different from the real space. For example, the image generator 4 may perform an additional display indicating that the virtual arm 82 comes to be a shape corresponding to a singular point or approaches this shape.

The virtual end effector 83 has a first virtual injection port 83a corresponding to the injection port 16. In the virtual end effector 83, a first virtual injection axis P1 corresponding to an injection axis of paint from the injection port 16 is set. The first virtual injection axis P1 extends from the first virtual injection port 83a. The first virtual injection axis P1 represents the posture of the virtual end effector 83.

The first virtual injection axis P1 also indicates a distance from the virtual end effector 83. Specifically, the type of a line showing the first virtual injection axis P1 is changed in accordance with the distance from the first virtual injection port 83a. In the example of FIG. 3, a portion of the first virtual injection axis P1 corresponding a range in which the distance from the first virtual injection port 83a is appropriate for coating is indicated by a broken line, and the other portion is indicated by a solid line. The user can judge whether the distance between the virtual end effector 83 and the first virtual workpiece 84a is appropriate or not depending on a portion of the first virtual injection axis P1 intersecting with the surface of the first virtual workpiece 84a. The first virtual injection axis P1 is an example of an image indicating the degree of a distance from the virtual tool.

The virtual operator 85 is located at a position in the VR space 80 corresponding to the position of the first sensor 62 in the real space. The virtual operator 85 has a second virtual injection port 85a. A second virtual injection axis P2 is set in the virtual operator 85. The second virtual injection axis P2 extends from the second virtual injection port 85a. The second virtual injection axis P2 represents a posture of the virtual operator 85.

The second virtual injection axis P2 indicates a distance from the virtual operator 85. Specifically, the type of a line showing the second virtual injection axis P2 is changed in accordance with the distance from the second virtual injection port 85a. In the example of FIG. 3, a portion of the second virtual injection axis P2 corresponding a range in which the distance from the second virtual injection port 85a is appropriate for coating is indicated by a broken line, and the other portion is indicated by a solid line. The user can judge whether the distance between the virtual operator 85 and the second virtual workpiece 84b is appropriate or not depending on a portion of the second virtual injection axis P2 intersecting with the surface of the second virtual workpiece 84b.

The second virtual workpiece 84b has the same size and shape as those of the first virtual workpiece 84a.

The virtual end effector 83 is offset from the virtual operator 85. In a manner similar to the virtual end effector 83, the first virtual workpiece 84a is offset from the second virtual workpiece 84b. As a result, a relative positional relationship between the second virtual workpiece 84b and the virtual operator 85 coincides with the relative positional relationship between the first virtual workpiece 84a and the virtual end effector 83. Specifically, the angle of the first virtual injection axis P1 with respect to the first virtual workpiece 84a coincides with the angle of the second virtual injection axis P2 with respect to the second virtual workpiece 84b. A position of an intersection point of the first virtual injection axis P1 in the first virtual workpiece 84a coincides with a position of an intersection point of the second virtual injection axis P2 in the second virtual workpiece 84b. A distance from the first virtual injection port 83a to the first virtual workpiece 84a coincides with a distance from the second virtual injection port 85a to the second virtual workpiece 84b.

The image generator 4 moves the virtual robot 81 in accordance with operation of the operator 3 by the user. For example, the image generator 4 causes the virtual robot 81 to move in synchronization with motion of the operator 3 in the real space in the VR space 80, based on a detection result of the first sensor 62. Specifically, the image generator 4 places the virtual robot 81 in the VR space 80 such that the position and posture of the virtual robot 81 correspond to the position and posture of the operator 3 in the real space obtained based on the detection result of the first sensor 62. The image generator 4 continues this process so that the virtual robot 81 in the VR space 80 thereby moves in synchronization with operation of the operator 3 in the real space.

The teaching point generator 2 generates, as a teaching point, the position and posture of the robot 1 in the real space corresponding to the position and posture of the virtual robot 81 in the virtual space 80. Specifically, teaching the point generator 2 generates the position and posture of a typical portion of the robot 1 as a teaching point. In this example, the typical portion of the robot 1 is the end effector 12. That is, the teaching point generator 2 generates a position including the posture of the end effector 12 as a teaching point. More specifically, the teaching point is the position and posture (i.e., orientation) of the injection port 16 of the coater in the end effector 12.

Specifically, the user generates a virtual teaching point that is a teaching point in the VR space 80 through the operation device 31 of the operator 3, while moving the virtual robot 81 in the VR space 80. At this time, the user also inputs information on whether the injection object is injected or not, to the image generator 4 though the operator 3. The image generator 4 generates a virtual teaching point based on a generation signal from the operator 3. The image generator 4 outputs the position and posture of the operator 3 in the operation coordinate system corresponding to the virtual teaching point, to the teaching point generator 2. The teaching point generator 2 obtains the position and posture of the end effector 12 in the robot coordinate system as a teaching point, from the position and posture of the operator 3 in the operation coordinate system. Consequently, the teaching point generator 2 generates a teaching point corresponding to the position of the virtual robot 81 in the virtual space 80. This process is repeated with the virtual robot 81 being moved in the VR space 80 so that the teaching point generator 2 generates teaching points in a chronological order and sets information on whether injection is performed or not in association with the teaching points.

The teaching point generator 2 creates teaching data based on teaching points. In this example, teaching data is a data set for moving the robot 1 in a trajectory passing through teaching points in a chronological order. In this example, the teaching data includes information on injection of the injection object (e.g., information on whether injection is performed or not).

Figure 4:
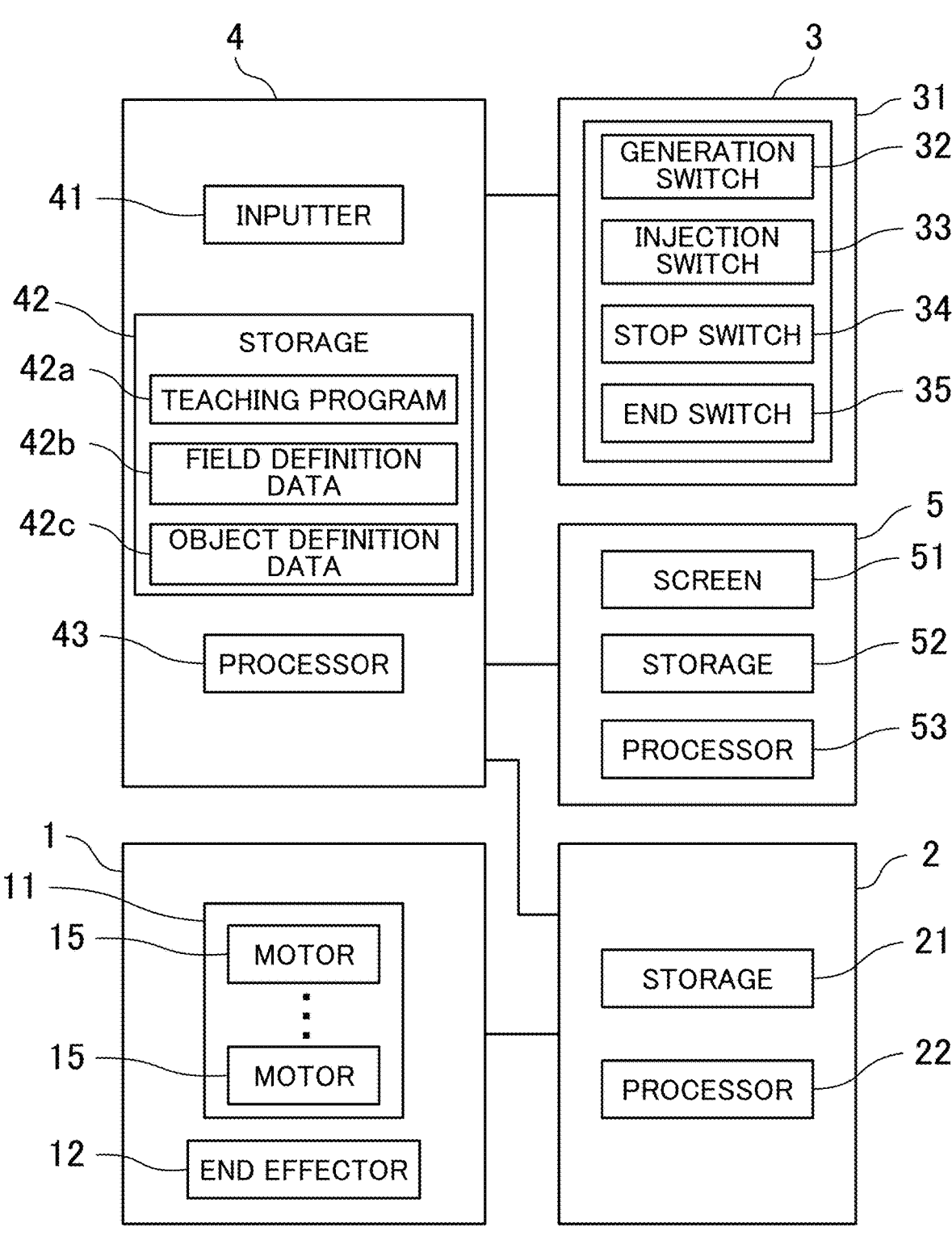
FIG. 4 is a block diagram schematically illustrating a hardware configuration of a teaching system.

FIG. 4 is a block diagram schematically illustrating a hardware configuration of the teaching system 100.

The teaching point generator 2 includes a storage 21 and a processor 22.

The storage 21 is a computer-readable medium that stores programs and various types of data. The storage 21 is a magnetic disc such as a hard disk, an optical disk such as a compact disc (CD) or a digital versatile disc (DVD), or a semiconductor memory. A storage 42 and a storage 52 described later also have similar configurations as the storage 21. The storage 21 stores teaching points and teaching data created based on the teaching points.

The processor 22 reads and executes programs stored in the storage 21 to thereby perform functions of the teaching point generator 2. The processor 22 includes processors such as a central processing unit (CPU), a graphics processing unit (GPU), and/or a digital signal processor (DSP), and semiconductor memories such as a video random access memory (VRAM), a random access memory (RAM), and/or a read only memory (ROM). A processor 43 and a processor 53 described later also have similar configurations as the processor 22.

The operation device 31 of the operator 3 includes a generation switch 32, an injection switch 33, a stop switch 34, and an end switch 35. Each of the generation switch 32, the injection switch 33, the stop switch 34, and the end switch 35 outputs an operation signal.

The generation switch 32 is a switch for generating a teaching point. The teaching point generator 2 generates, as a teaching point, the position and posture of the robot 1 in the robot coordinate system corresponding to the virtual robot 81 when the generation switch 32 is operated. At this time, the image generator 4 generates the position and posture of the virtual robot 81 when the generation switch 32 is operated, as a virtual teaching point. Thus, the generation switch 32 can also be regarded as a switch for generating a virtual teaching point.

The injection switch 33 is a switch for setting execution of paint injection. The user operates the injection switch 33 while the virtual robot 81 is located at a position of starting paint injection in the VR space 80 so that the image generator 4 thereby sets execution of paint injection at this position of the virtual robot 81.

The stop switch 34 is a switch for setting stop of paint injection. The user operates the stop switch 34 while the virtual robot 81 is located at a position of stopping paint injection in the VR space 80 so that the image generator 4 thereby sets stop of paint injection at this position of the virtual robot 81.

The end switch 35 is a switch for finishing teaching work. The user operates the end switch 35 when the virtual robot 81 reaches a position of finishing teaching work in the VR space 80 so that the image generator 4 thereby sets end of teaching work at this position of the virtual robot 81.

The display 5 includes a screen 51, the storage 52, and the processor 53.

The screen 51 is, for example, a liquid crystal display or an organic electro-luminescence (EL) display. The screen 51 is capable of displaying an image for the right eye and an image for the left eye. That is, the screen 51 displays a three-dimensional image including the image for the right eye and the image for the left eye.

The storage 52 is a computer-readable medium that stores programs and various types of data. The storage 52 is, for example, a semiconductor memory. The storage 52 stores programs and various types of data for causing a computer, that is, the processor 53, to perform functions for displaying the VR image 8 on the screen 51.

The processor 53 reads and executes programs stored in the storage 52 to thereby collectively control sections of the display 5 and perform functions for displaying the VR image 8 on the screen 51.

The display 5 may include a headphone. The user can hear audio information necessary for teaching work through the headphone.

The image generator 4 includes an inputter 41, the storage 42, and the processor 43.

The inputter 41 receives an operation input from the user. The inputter 41 outputs an input signal in accordance with an operation input, to the processor 43. For example, the inputter 41 is a keyboard or a mouse. The inputter 41 is used for inputting settings of display and non-display of objects described later and for inputting settings of display contents.

The storage 42 is a computer-readable medium that stores programs and various types of data. The storage 42 stores a teaching program 42a, field definition data 42b, and object definition data 42c.

The field definition data 42b defines a field in which the virtual robot 81 and other objects are placed. For example, the field definition data 42b defines the floor, wall, and others of a factory. The object definition data 42c defines objects necessary for performing a treatment of the virtual robot 81 in the VR space 80. For example, the object definition data 42c of the virtual robot 81, the first virtual workpiece 84a, the second virtual workpiece 84b, the virtual operator 85, the virtual facilities, and other objects is prepared. For example, the field definition data 42b and the object definition data 42c are created based on actual design data of the robot 1 and others. In this case, an actual workpiece W does not need to be obtained for teaching, and teaching work can be performed before the workpiece W is obtained. The field definition data 42b and the object definition data 42c may be created based on actually measured values obtained by actually measuring the robot 1 and others.

The processor 43 reads and executes programs such as the teaching program 42a stored in the storage 42 to thereby perform functions for causing the image generator 4 as a computer to generate the VR image 8.

Figure 5:
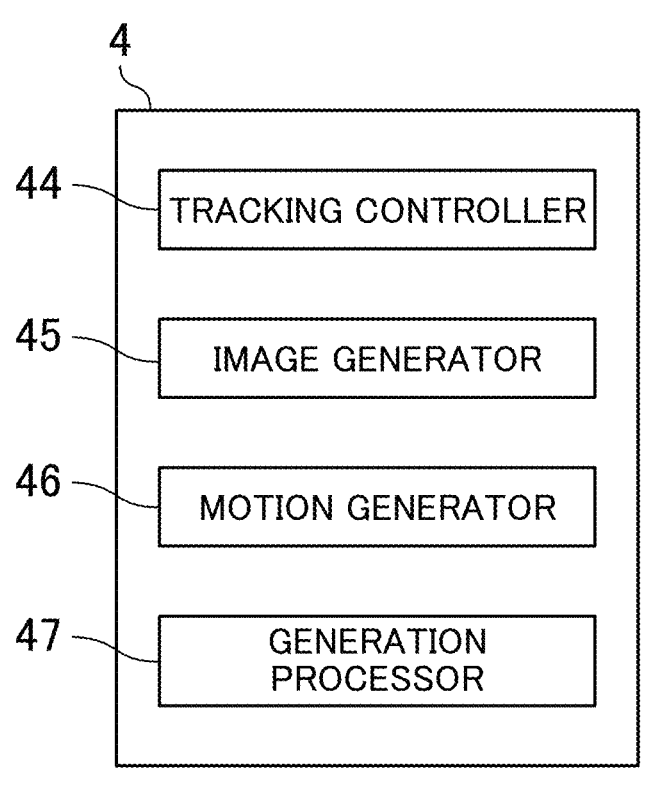
FIG. 5 is a functional block diagram of an image generator.
Figure 6:
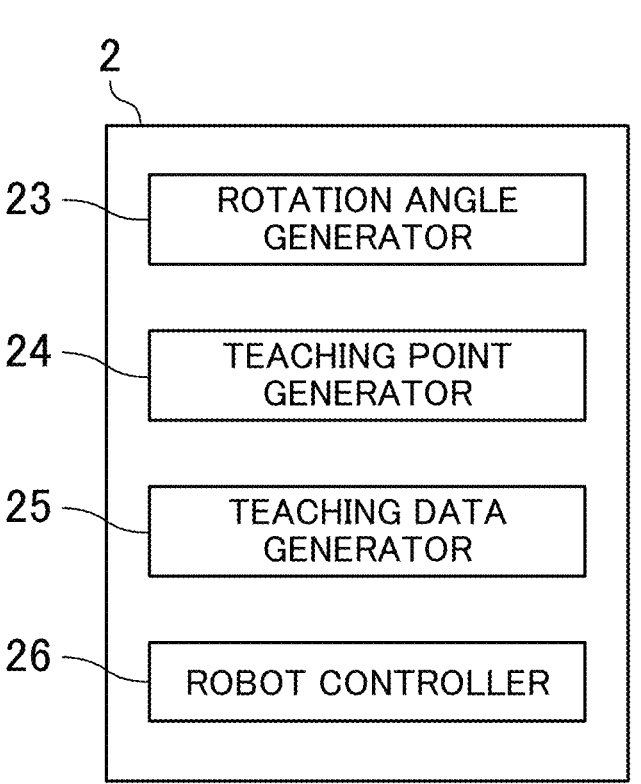
FIG. 6 is a functional block diagram of a teaching point generator.

FIG. 5 is a functional block diagram of the image generator 4. FIG. 6 is a functional block diagram of the teaching point generator 2.

The image generator 4 includes a tracking controller 44, an image generator 45, a motion generator 46, and a generation processor 47, as functional blocks. The image generator 45 has the function of generating a virtual image in which a virtual robot corresponding to a robot is placed in a virtual space. The motion generator 46 has the function of moving the virtual robot in the virtual image in accordance with operation to the operator from the user for moving the virtual robot from the user. The generation processor 47 has the function of generating a teaching point of the robot based on the position of the virtual robot in the virtual space.

The tracking controller 44 calculates the positions and postures of the operator 3 and the display 5 in the VR space 80 based on a detection result of the tracking system 6. The tracking controller 44 performs calculation processes concerning tracking based on emission information of the light emitters 61, a detection result of the first sensor 62, and a detection result of the second sensor 63. Specifically, the tracking controller 44 obtains the position and posture of the operator 3 in the operation coordinate system of the real space based on the detection result of the first sensor 62 and the emission information of the light emitters 61. The tracking controller 44 obtains the position and posture of the display 5 in the operation coordinate system of the real space based on the detection result of the second sensor 63 and the emission information of the light emitters 61.

The image generator 45 generates the VR image 8. The image generator 45 reads the field definition data 42b and the object definition data 42c from the storage 42, and generates the VR space 80 and objects. In the VR space 80, a VR coordinate system corresponding to the robot coordinate system in the real space is set. Based on the VR coordinate system, the image generator 45 places the virtual robot 81, the first virtual workpiece 84a, the virtual facilities, and other objects in the VR space 80. The image generator 45 makes a relative positional relationship between the virtual robot 81 and the first virtual workpiece 84a, and the virtual facilities in the VR coordinate system coincide with a relative positional relationship between the robot 1 and the workpiece W, and facilities in the robot coordinate system. The image generator 45 also generates the virtual robot 81 in accordance with a motion required by the motion generator 46.

Then, the image generator 45 sets a line of sight in the VR space 80 and generates the VR image 8 based on the line of sight. Specifically, the image generator 45 obtains the position and posture of the display 5 in the VR space 80 based on a predetermined coordinate correspondence, from the position and posture of the display 5 in the operation coordinate system obtained by the tracking controller 44. The coordinate correspondence here is a correspondence between the operation coordinate system of the tracking system 6 and the VR coordinate system of the VR space 80. The image generator 45 sets the position of the display 5 in the VR coordinate system to the position of the line of sight (i.e., the position of eyes) of the user in the VR space 80, and sets the posture of the display 5 in the VR coordinate system to the line of sight of the user in the VR space 80. The image generator 45 generates the VR image 8 in accordance with the set position and direction of the line of sight. The image generator 45 outputs the generated VR image 8 to the display 5.

The motion generator 46 generates a motion of the virtual robot 81 in the VR space 80 in accordance with the position and posture of the operator 3 in the real space obtained by the tracking controller 44. The motion generator 46 obtains the position and posture of the virtual operator 85 in the VR coordinate system based on a coordinate correspondence between the operation coordinate system and the VR coordinate system, from the position and posture of the operator 3 in the operation coordinate system. The motion generator 46 sets the position of the virtual end effector 83 (specifically, the position of the first virtual injection port 83a) to a position shifted from the position of the virtual operator 85 (specifically, the position of the second virtual injection port 85a) in a predetermined offset direction by a predetermined offset amount. The motion generator 46 makes the posture of the virtual end effector 83 coincide with the posture of the virtual operator 85. Specifically, the motion generator 46 makes the first virtual injection axis P1 parallel to the second virtual injection axis P2. In this manner, the position and posture of the virtual end effector 83 are determined.

In addition, the motion generator 46 obtains the position and posture of the end effector 12 in the real space from the position and posture of the virtual end effector 83 in the VR space 80 based on the coordinate correspondence between the VR coordinate system and the robot coordinate system. The motion generator 46 outputs the position and posture of the end effector 12 to the teaching point generator 2. Although described later in detail, the teaching point generator 2 calculates rotation angles of the joints 14 of the robot arm 11 (i.e., rotation angles of the motors 15) for achieving the position and posture of the end effector 12. The teaching point generator 2 outputs the calculated rotation angles of the joints 14 to the motion generator 46. The motion generator 46 generates the virtual arm 82 to achieve the rotation angles of the joints 14 input from the teaching point generator 2.

Through the process described above, the motion generator 46 can generate the virtual robot 81 including the virtual end effector 83 located in the position and posture in accordance with the position and posture of the operator 3 in the real space. The motion generator 46 generates, that is, updates, the virtual robot 81 in accordance with the position and posture of the operator 3 in the real space obtained successively to thereby move the virtual robot 81 in synchronization with the operator 3.

In addition, the motion generator 46 sets a motion limitation on a motion range of the virtual robot 81. In a case where the virtual robot 81 reaches the motion limitation, the motion generator 46 notifies that the virtual robot 81 has reached the motion limitation. For example, the motion generator 46 outputs a warning signal to the image generator 45 in the case where the virtual robot 81 reaches the motion limitation. When the image generator 45 receives the warning signal, the image generator 45 displays that the virtual robot 81 has reached the motion limitation. In this manner, the user is notified that the virtual robot 81 has reached the motion limitation. For example, the motion limitation includes motion limitation on the virtual arm 82 itself and motion limitation derived from surroundings of the virtual arm 82. The motion limitation on the virtual arm 82 itself is, for example, limitation on the rotation angle of the joints of the virtual arm 82, such as a singular point. The limitation on the rotation angles of the joints of the virtual arm 82 is the same as limitation on the rotation angles of the joints 14 of the robot arm 11 in the real space. For example, the motion limitation derived from surroundings of the virtual arm 82 includes limitation by interference between virtual arm 82 and virtual facilities. Examples of the virtual facilities include the virtual supporter 87, the virtual booth 88, and the virtual fence 89, which will be described later. The motion limitation on the virtual robot 81 is set with a margin to the limitation of the rotation angles of the joints 14 and interference with facilities.

Based on an operation signal from the operator 3, the generation processor 47 outputs a generation instruction for generating a teaching point to the teaching point generator 2. Specifically, when the generation processor 47 receives the operation signal of the generation switch 32, the generation processor 47 outputs, to the teaching point generator 2, a generation instruction for generating a teaching point together with the position and posture of the operator 3 in the operation coordinate system at this time. The generation processor 47 sets the position and posture of the virtual end effector 83 when the generation processor 47 receives the operation signal of the generation switch 32, as a virtual teaching point.

In addition, based on the operation signal from the operator 3, the generation processor 47 sets information on whether paint is injected or not. Specifically, when the generation processor 47 receives the operation signal of the injection switch 33, the generation processor 47 sets paint injection execution. On the other hand, when the generation processor 47 receives the operation signal of the stop switch 34, the generation processor 47 sets paint injection stop. In outputting a generation instruction to the teaching point generator 2, the generation processor 47 also outputs paint injection information (e.g., injection execution or injection stop).

The generation processor 47 also outputs paint injection information to the image generator 45. The image generator 45 switches display of virtual paint injected from the virtual end effector 83 between display and non-display in accordance with paint injection information.

When the generation processor 47 receives the operation signal of the end switch 35, the generation processor 47 outputs an end instruction for performing an end process of ending teaching work, to the teaching point generator 2.

The teaching point generator 2 includes, as functional blocks, a rotation angle generator 23, a teaching point generator 24, a teaching data generator 25, and a robot controller 26.

The rotation angle generator 23 calculates rotation angles of the joints 14 of the robot arm 11 (i.e., rotation angles of the motors 15) for achieving the position and posture of the end effector 12 in the real space input from the motion generator 46. Since the lengths of the links 13 of the robot arm 11 are known, when the angles of the joints 14 are determined, the position and posture of the robot 1, that is, the position and posture of the end effector 12, are uniquely determined. Thus, when the rotation angle generator 23 receives the position and posture of the end effector 12, the rotation angle generator 23 can obtain the rotation angles of the joints 14 based on the lengths of the links 13. The rotation angle generator 23 stores the obtained rotation angles of the joints 14 in the storage 21 and outputs these rotation angles to the motion generator 46.

The teaching point generator 24 generates a teaching point. The teaching point generator 24 obtains the position and posture of the end effector 12 in the robot coordinate system as a teaching point based on the position and posture of the operator 3 in the operation coordinate system input together with the generation instruction for a teaching point. In this example, since the virtual end effector 83 is offset from the virtual operator 85 in the VR image 8, the teaching point generator 24 uses, as the position and posture of the end effector 12 in the robot coordinate system, the position and posture of the operator 3 offset similarly from the position and posture of the operator 3 converted from the operation coordinate system to the robot coordinate system. The teaching point generator 24 stores a generated teaching point in the storage 21. At this time, the teaching point generator 24 also stores paint injection information in the storage 21 together with the teaching point. At every input of the generation instruction, the teaching point generator 24 stores a teaching point and paint injection information in the storage 21. Teaching points and paint injection information are accumulated in the storage 21.

The teaching data generator 25 generates teaching data based on the teaching points generated by the teaching point generator 24. When the teaching data generator 25 receives the end instruction from the generation processor 47, the teaching data generator 25 generates teaching data as an end process of ending teaching work.

The teaching data generator 25 reads generated teaching points from the storage 21. The teaching data generator 25 also reads the rotation angles of the joints 14 of the robot arm 11 and paint injection information individually corresponding to the teaching points, from the storage 21. In this manner, the teaching data generator 25 generates teaching data. The teaching data includes multiple sets of the rotation angles of the joints 14, multiple sets of chronological information, and paint injection information (injection execution or injection stop) for individual sets.

The robot controller 26 controls the robot 1 based on the teaching data and moves the robot 1 in the real space. The robot controller 26 performs a process after generation of the teaching data, and does not directly contribute to generation of the teaching data. Specifically, the robot controller 26 performs autonomous operation of the robot 1. For example, the user operates the teaching point generator 2 so that an instruction for autonomous operation of the robot 1 is thereby input to the robot controller 26. The robot controller 26 controls the robot 1 based on the teaching data. Specifically, the robot controller 26 calculates the rotation angles of the motors 15 for achieving the rotation angles of the corresponding joints 14, and supplies currents corresponding the calculated rotation angles to the motors 15. The robot controller 26 also controls the end effector 12 in accordance with paint injection information included in the teaching data. Specifically, in a case where execution of paint injection has been already set, the robot controller 26 executes paint injection from the end effector 12. On the other hand, in a case where stop of paint injection has been already set, the robot controller 26 stops paint injection from the end effector 12.

In this manner, the robot 1 moves while drawing a trajectory passing through the generated teaching points, and injects paint in a specific section among the teaching points. Consequently, coating is performed on the workpiece W.

Teaching work using the teaching system 100 is performed by operation of the operator 3 by the user wearing the display 5 on the head while seeing the VR image 8 displayed on the display 5. In this example, the teaching system 100 is capable of switching between a first teaching mode and a second teaching mode. The first teaching mode us a mode in which the teaching work is performed with display of the VR image 8 seen from the user located in a movable range of the virtual robot 81. The second teaching mode is a mode in which the teaching work is performed with display of the VR image 8 seen from the user out of the movable range of the virtual robot 81. Switching between the first teaching mode and the second teaching mode is performed by the user through the inputter 41, for example.

The correspondence between the operation coordinate system of the tracking system 6 and the VR coordinate system of the VR space 80 is different between the first teaching mode and the second teaching mode. That is, the correspondence between the operation coordinate system of the tracking system 6 and the VR coordinate system of the VR space 80 includes a first correspondence for the first teaching mode and a second correspondence for the second teaching mode. With the first correspondence, an operating area of the tracking system 6 corresponds to the first region 80*a* inside the virtual fence 89. With the second correspondence, the operating area of the tracking system 6 corresponds to the second region 80*b* outside the virtual fence 89. That is, in the first teaching mode, the user moving in the operating area of the tracking system 6 in the real space moves inside the virtual fence 89 that is the first region 80*a* in the VR space 80. On the other hand, in the second teaching mode, the user moving in the operating area of the tracking system 6 in the real space moves outside the virtual fence 89 that is the second region 80*b* in the VR space 80. The image generator 4 switches between the VR image 8 for the first teaching mode and the VR image 8 for the second teaching mode by switching between the first correspondence and the second correspondence.

Figure 7:
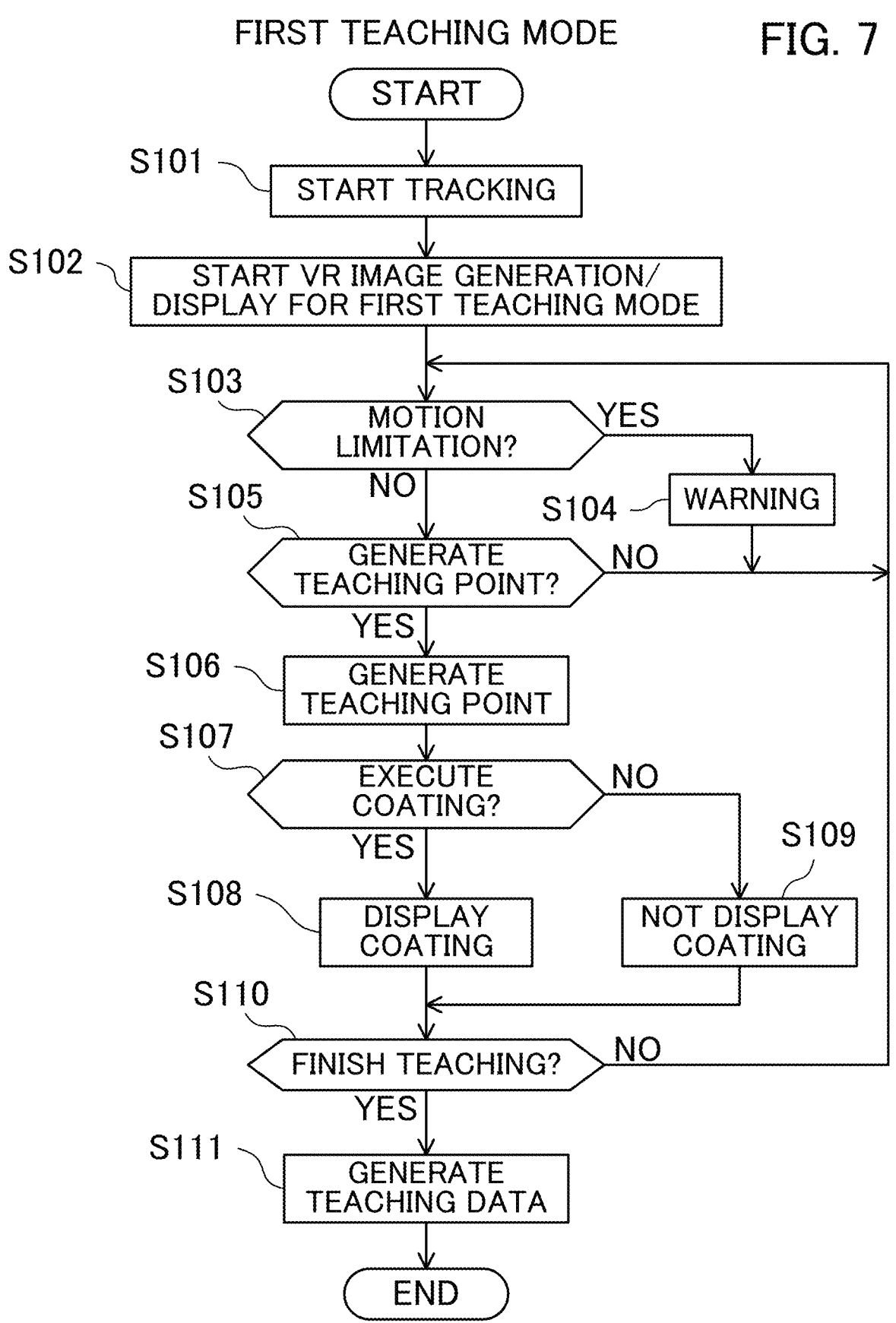
FIG. 7 is a flowchart of a first teaching mode.
Figure 8:
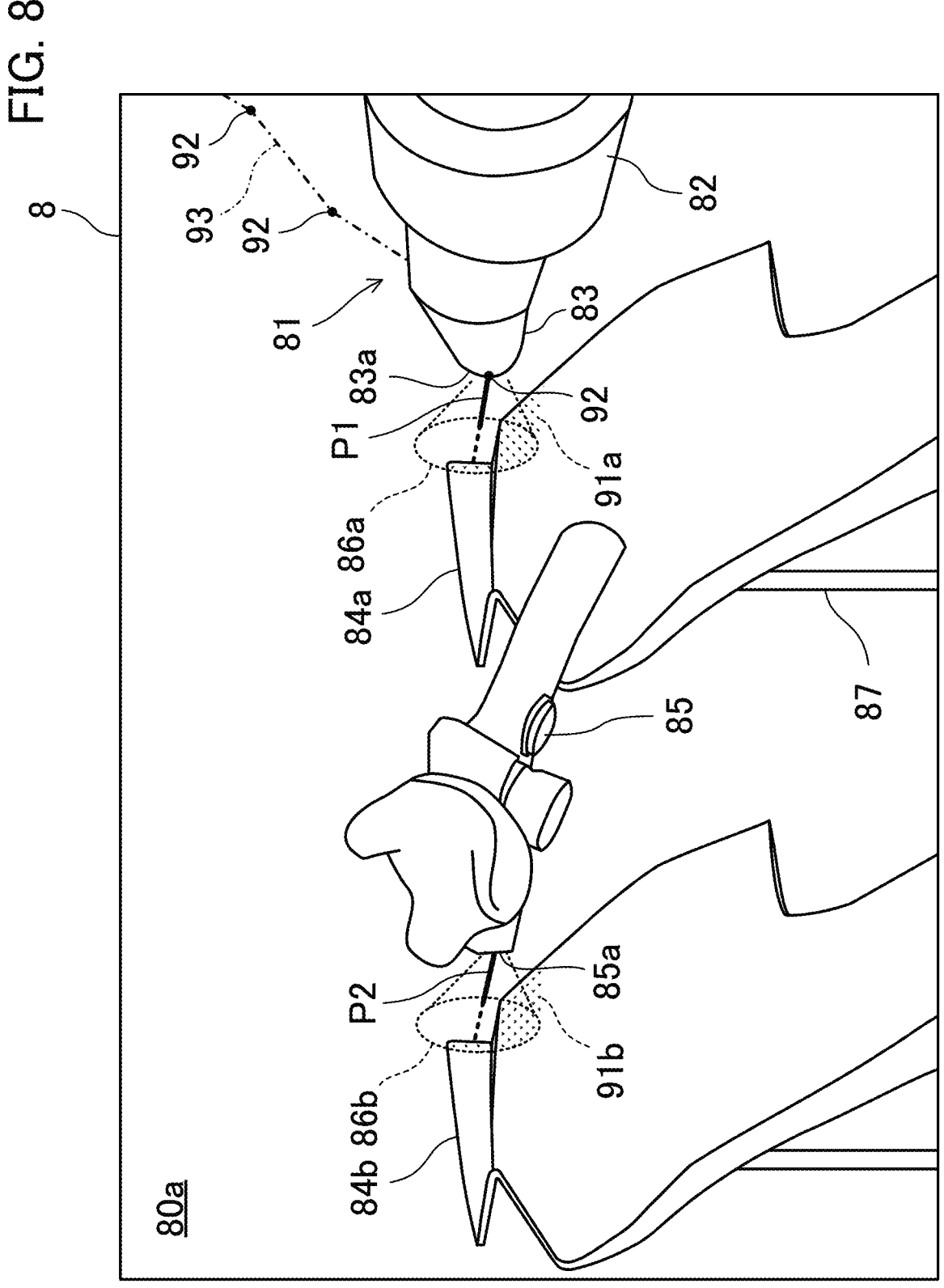
FIG. 8 is an example of a VR image at coating start in the first teaching mode.
Figure 9:
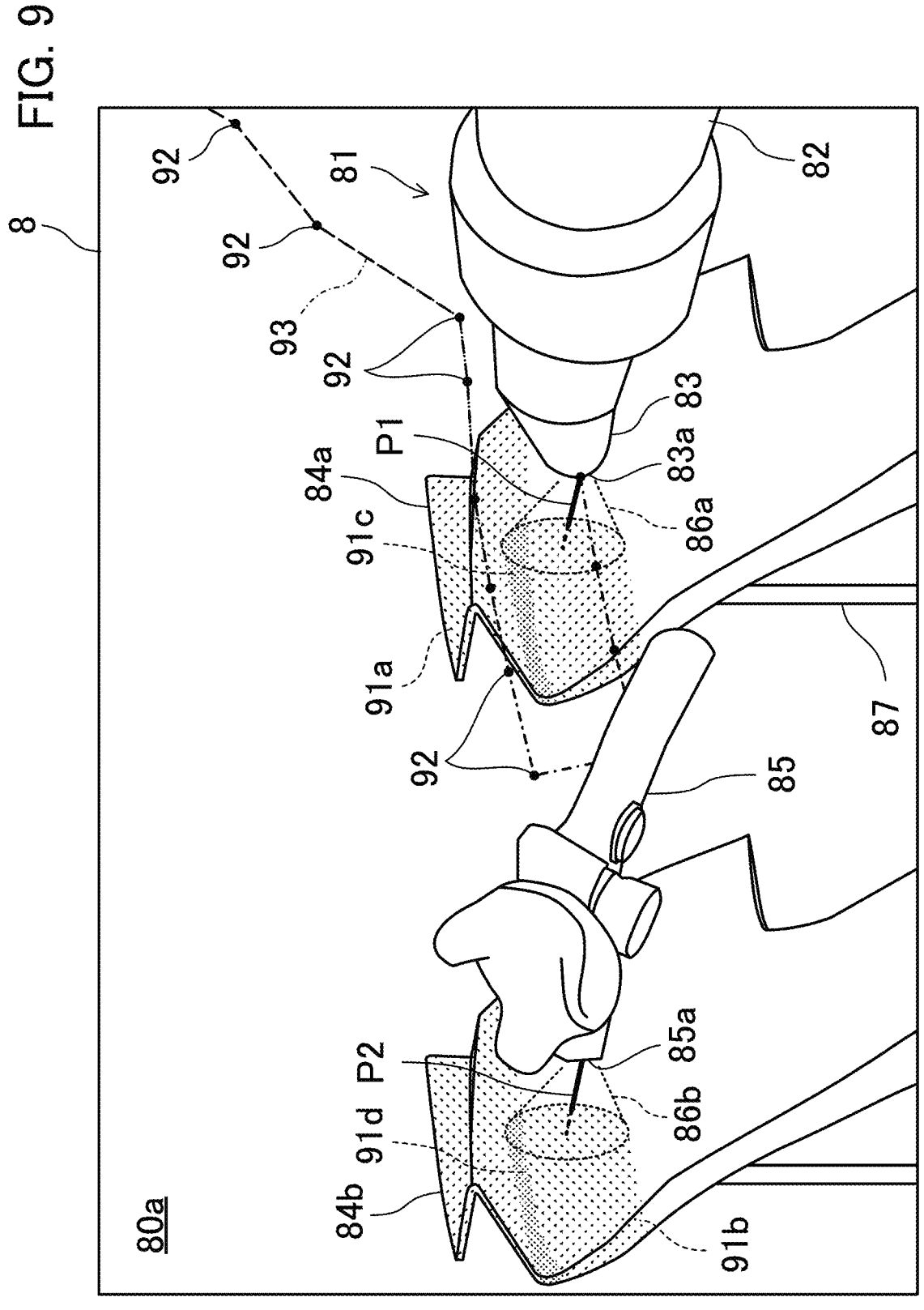
FIG. 9 is an example of a VR image during coating in the first teaching mode.

First, the first teaching mode will be described. FIG. 7 is a flowchart of the first teaching mode. FIG. 8 is an example of the VR image 8 at start of coating in the first teaching mode. FIG. 9 is an example of the VR image 8 during coating in the first teaching mode.

When teaching work in the first teaching mode starts, the tracking system 6 starts tracking in step S101. Specifically, the tracking system 6 starts detection and tracking of the positions and postures of the operator 3 and the display 5 in the real space.

After the start of tracking by the tracking system 6, the image generator 4 generates the VR image 8 in step S102. The display 5 displays the generated VR image 8. In the first teaching mode, the image generator 4 generates the VR image 8 seen from the user in the first region 80*a*. For example, the VR image 8 in FIG. 3 is the VR image 8 in the first teaching mode.

Specifically, the image generator 45 reads the field definition data 42*b* and the object definition data 42*c* from the storage 42 and generates the VR space 80, the virtual robot 81, and other objects. In the first teaching mode, the second virtual workpiece 84*b* is placed near the first virtual workpiece 84*a* in the first region 80*a*.

The motion generator 46 generates a motion of the virtual robot 81 in accordance with the position and posture of the operator 3. At this time, the image generator 45 and the motion generator 46 convert the positions and postures of the operator 3 and the display 5 in the operation coordinate system of the tracking system 6 to the positions and postures in the VR coordinate system of the VR space 80 by using the first correspondence for the first teaching mode. The image generator 45 causes the virtual robot 81 to perform the motion generated by the motion generator 46 and generates the VR image 8 in the line of sight in accordance with the position and posture of the display 5.

The user operates the operator 3 while seeing the VR image 8 displayed on the display 5 to thereby move the virtual robot 81 in the VR image 8. When the user is intended to perform coating on the second virtual workpiece 84*b* with the virtual operator 85 in the VR space 80, the user is located in the first region 80*a*. In the first teaching mode, since the user is located in the first region 80*a*, the user is capable of performing teaching work while observing the states of the virtual end effector 83 and the first virtual workpiece 84*a* at a position close to the virtual robot 81. The first teaching mode can also be referred to as a close teaching mode.

Step S102 corresponds to generating a virtual image in which a virtual robot corresponding to a robot is placed in a virtual space, displaying the virtual image, and moving the virtual robot in the virtual image in accordance with operation from a user to an operator for moving the virtual robot.

In step S103, the motion generator 46 determines whether the virtual robot 81 has reached motion limitation or not. If the virtual robot 81 has reached the motion limitation, warning is issued in step S104. For example, the image generator 45 displays warning indicating that the virtual robot 81 has reached motion limitation in the VR image 8. Steps S103 and S104 are repeated until motion of the virtual robot 81 falls within the range of the motion limitation.

That is, while the user moves the virtual robot 81 by operating the operator 3, motion limitation similar to that on the actual robot 1 is imposed on the motion range of the virtual robot 81. The robot 1 in the real space is subjected to motion limitation by limitation of the rotation angles of the joints 14 and interference between the robot arm 11 and the safety fence, the coating booth, or the like. In this manner, it is possible to prevent the virtual robot 81 from performing a motion that cannot be performed in the real space.

If the virtual robot 81 has not reached the motion limitation, the image generator 4 determines whether a generation instruction of a teaching point is received or not in step S105. Specifically, the generation processor 47 determines whether an operation signal of the generation switch 32 is received from the operator 3 or not. If the generation processor 47 does not receive the operation signal of the generation switch 32, the process returns to step S103. That is, monitoring of motion limitation and determination of generation instruction of a teaching point are repeated.

For example, when the virtual robot 81 is located at a desired teaching point, the user operates the generation switch 32. If the generation processor 47 receives the operation signal of the generation switch 32, the teaching point generator 2 generates the teaching point in step S106. Specifically, when the generation processor 47 receives the operation signal of the generation switch 32, the generation processor 47 outputs a generation instruction to the teaching point generator 2. On the other hand, the teaching point generator 2 receives the position and posture of the end effector 12 in the real space corresponding to the position and posture of the virtual end effector 83 from the image generator 4 successively, and calculates the rotation angles of the joints 14. The teaching point generator 24 generates the immediately preceding position and posture of the end effector 12 when the generation instruction is received as a teaching point, and stores the teaching point in the storage 21. The teaching point generator 24 also stores the rotation angles of the joints 14 corresponding to the position and posture of the end effector 12 generated as the teaching point, in the storage 21. At this time, the generation processor 47 uses the position and posture of the virtual end effector 83 in the VR coordinate system when the generation processor 47 receives the operation signal of the generation switch 32, as a virtual teaching point.

In a case where teaching points are generated, the image generator 4 displays virtual teaching points 92 in the VR image 8, as illustrated in FIG. 3. Specifically, the image generator 45 generates the VR image 8 in which the virtual teaching points 92 generated by the generation processor 47 are placed in the VR space 80. The image generator 45 also displays a trajectory 93 connecting the virtual teaching points 92 in a chronological order. That is, the image generator 45 places, in the VR space 80, a predetermined number of immediately preceding virtual teaching points among virtual teaching points sequentially generated with time.

In generating teaching points, the generation processor 47 determines execution and stop of coating in step S107. Specifically, the generation processor 47 determines whether the operation signal of the injection switch 33 and the operation signal of the stop switch 34 are present or not. If the generation processor 47 has received the operation signal of the injection switch 33, execution of coating is set. On the other hand, if the generation processor 47 has received the operation signal of the stop switch 34, stop of coating is set. The generation processor 47 outputs the coating setting to the teaching point generator 2 and the image generator 45. The teaching point generator 24 of the teaching point generator 2 stores the coating setting in the storage 21 in association with teaching points.

The image generator 45 switches virtual paint display from the virtual end effector 83 and the virtual operator 85 between display and non-display in accordance with the coating setting. Specifically, if execution of coating is set, the image generator 45 displays a first virtual paint 86a injected from the virtual end effector 83 and a second virtual paint 86b injected from the virtual operator 85 in step S108. On the other hand, if stop of coating is set, the image generator 45 does not display (non-display) the first virtual paint 86a injected from the virtual end effector 83 and the second virtual paint 86b injected from the virtual operator 85 in step S109.

For example, as illustrated in FIG. 8, when the virtual end effector 83 moves to a paint injection start position near the first virtual workpiece 84a, the user operates the generation switch 32 and the injection switch 33. Then, the image generator 45 displays the virtual teaching points 92 and also displays the first virtual paint 86a and the second virtual paint 86b in the VR image 8.

The first virtual paint 86a corresponds to paint injected from the end effector 12. The first virtual paint 86a is injected from the first virtual injection port 83a. The first virtual paint 86a has a conical outer shape about the first virtual injection axis P1 as a center axis. The outer shape of the first virtual paint 86a represents a virtual injection range corresponding to an injection range of paint (e.g., range where paint is effectively injected) in the real space. The first virtual paint 86a is an example of a virtual injection object.

The second virtual paint 86b is injected from the second virtual injection port 85a. The second virtual paint 86b has a conical outer shape about the second virtual injection axis P2 as a center axis. The outer shape of the second virtual paint 86b is the same as the outer shape of the first virtual paint 86a. That is, the outer shape of the second virtual paint 86b represents a virtual injection range corresponding to an injection range of paint in the real space.

In addition, in the case of executing coating, the image generator 45 displays a first coating film 91a in a portion of the first virtual workpiece 84a subjected to the coating. The first coating film 91a is displayed in a color different from that of the surface of the first virtual workpiece 84a. Similarly, the image generator 45 displays a second coating film 91b in a portion of the second virtual workpiece 84b subjected to the coating. The second coating film 91b is displayed in a color different from that of the surface of the second virtual workpiece 84b. The first coating film 91a and the second coating film 91b are examples of display indicating a state after the process, that is, after coating.

Referring back to the description of the flow of the first teaching mode, the image generator 4 determines whether an end instruction of teaching work is issued or not, in step S110. Specifically, the image generator 4 determines whether an operation signal of the end switch 35 is received or not. If the image generator 4 does not receive the operation signal of the end switch 35, the process returns to step S103. That is, processes from monitoring of motion limitation are repeated, and generation of teaching points continues.

As illustrated in FIG. 9, the user generates teaching points while continuing coating of the first virtual workpiece 84a by the virtual end effector 83 and coating of the second virtual workpiece 84b by the virtual operator 85.

At this time, the image generator 45 displays an image such that an overlapping portion of the first coating film 91a can be distinguished. In this example, an overlapping portion 91c of the first coating film 91a is displayed in a color different from the other portion. Similarly, an overlapping portion 91d of the second coating film 91b is displayed in a color different from the other portion. Display of the first coating film 91a, the overlapping portion 91c, and other portion enables the user to perform generation of teaching points while judging suitability of coating.

When the generation of the teaching points is finished, the user operates the end switch 35. In a case where the image generator 4 receives the operation signal of the end switch 35, the generation processor 47 outputs an end instruction to the teaching point generator 2. In step S111, the teaching point generator 2 generates teaching data. Specifically, the teaching data generator 25 creates teaching data based on teaching points and other information stored in the storage 21 and stores the created teaching data in the storage 21. In this manner, teaching work in the first teaching mode is finished.

In a period from generation of teaching points to end of the generation, a process of resetting the generated teaching points may be performed. When this process is performed, generation of teaching points is started again from the beginning. That is, the teaching points stored in the storage 21 are reset, and the process starts again from step S103.

In the manner described above, the user operates the operator 3 while seeing the VR image 8 to move the virtual robot 81. In the first teaching mode, since the line of sight of the user is located in the first region 80a, the VR image 8 close to the virtual end effector 83 can be generated, as illustrated in FIG. 3, for example. Thus, the user can perform teaching while observing the virtual end effector 83 near the virtual end effector 83. Since the VR image 8 is used, the user can approach the virtual end effector 83 without considering interference between the user and the virtual robot 81. For example, the user may also generate teaching points while seeing the virtual end effector 83 and other objects from a position interfering with the virtual arm 82.

The image generator 45 switches between display and non-display of objects and adjusts display contents, in accordance with settings by the user. Specifically, the image generator 45 can switch between display and non-display for each of the virtual arm 82, the second virtual workpiece 84b, the virtual operator 85, the first virtual paint 86a, the second virtual paint 86b, the first virtual injection axis P1, the second virtual injection axis P2, the virtual supporter 87, the virtual booth 88, the virtual fence 89, the virtual teaching points 92, the trajectory 93, and so forth. The switching between display and non-display and display contents can be set by the user through the inputter 41.

Figure 10:
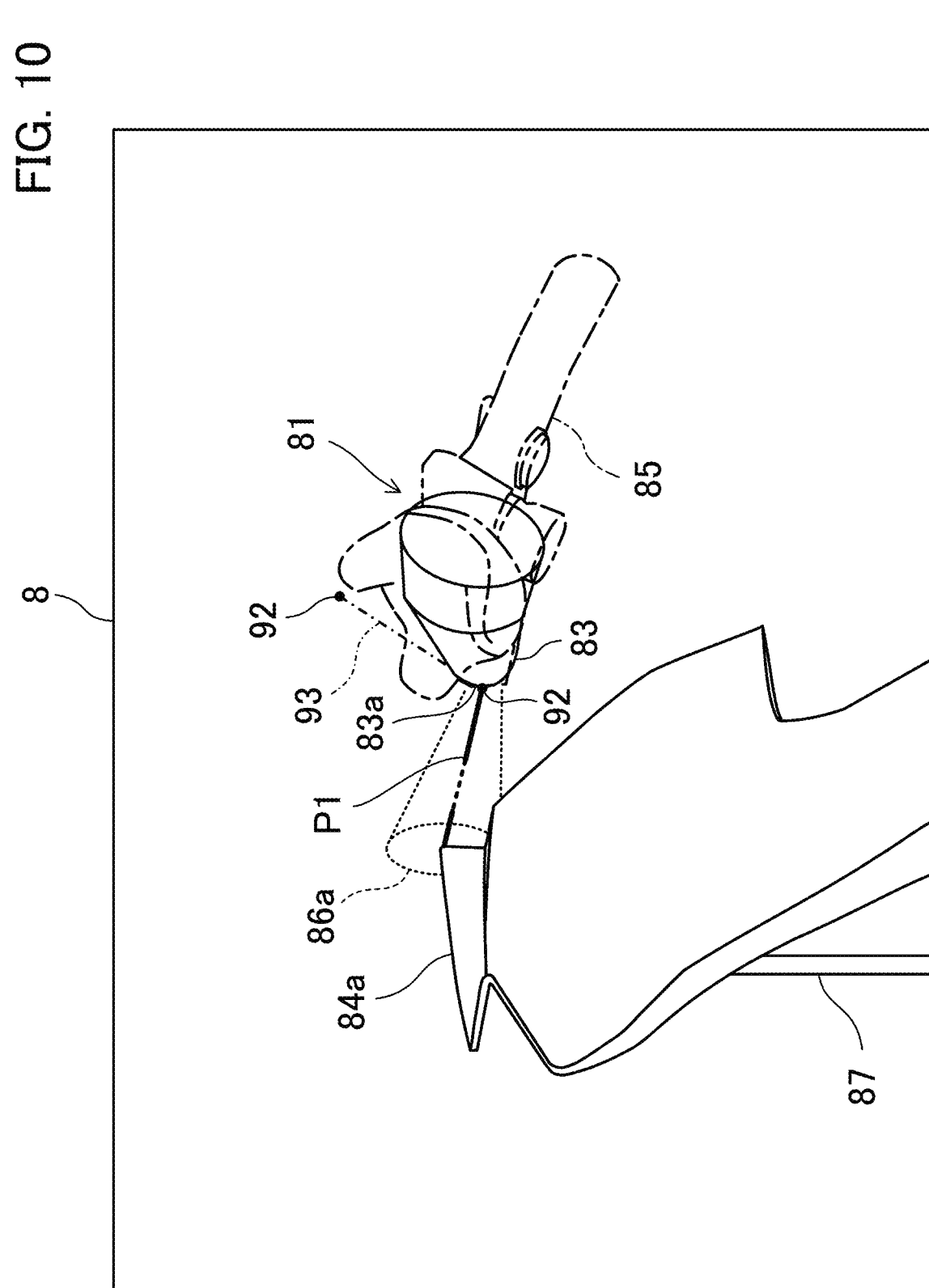
FIG. 10 is another example of the VR image in the first teaching mode.

FIG. 10 shows another example of the VR image 8 in the first teaching mode. In the VR image 8 of FIG. 10, the virtual arm 82 is not displayed. In this manner, the image generator 4 can switch between display and non-display of the virtual arm 82. By displaying the virtual arm 82, the user can generate teaching points while observing a situation of the virtual arm 82 as well as the virtual end effector 83. On the other hand, by non-displaying the virtual arm 82, a situation of the virtual end effector 83 can be easily observed. Accordingly, portions that were hidden by the virtual arm 82 can also be observed.

In the VR image 8 of FIG. 10, the virtual operator 85 is displayed while being superimposed on the virtual end effector 83, and the second virtual workpiece 84b, the second virtual paint 86b, and the second virtual injection axis P2 are not displayed. At this time, the offset amount of the virtual end effector 83 to the virtual operator 85 is set at zero. The image generator 45 displays the virtual end effector 83 at the position of the virtual operator 85 in the VR space 80. The image generator 45 may display only the virtual end effector 83 while not displaying the virtual operator 85 at all. In the case where the offset amount is zero, the VR image 8 is an image as if the user holds and moves the virtual end effector 83. In the example of FIG. 10, the virtual arm 82 is not displayed. Alternatively, the virtual end effector 83 may be superimposed on the virtual operator 85 with the virtual arm 82 being displayed.

The offset amount of the virtual end effector 83 to the virtual operator 85 may not be zero, and may be set at any value. The offset direction may be set at any direction. The offset direction and the offset amount may be set by the user through the inputter 41. The image generator 45 places the virtual end effector 83 with reference to the virtual operator 85 based on the offset direction and the offset amount that have been set.

In regard to display contents, the image generator 45 can change the outer shape (e.g., expansion angle) of the first virtual paint 86a, for example. In the example of FIG. 10, the expansion angle of the first virtual paint 86a is narrow, and the dimension of the first virtual paint 86a in the direction of the first virtual injection axis P1 is long, as compared to the examples of FIG. 8 and other drawings. In a case where the second virtual paint 86b is displayed, the second virtual paint 86b can also be changed in a manner similar to the first virtual paint 86a.

The image generator 45 can change a display mode of the virtual teaching points 92. For example, the image generator 45 is capable of switching between a mode in which all the virtual teaching points 92 are displayed and a mode in which a finite number of immediately preceding virtual teaching points 92 are displayed. In the case of displaying a finite number of virtual teaching points 92, the number of virtual teaching points 92 displayed can be changed. In the example of FIG. 10, the number of virtual teaching points 92 that are displayed is two, and two immediately preceding virtual teaching points 92 are displayed. The image generator 45 may not display the trajectory 93.

Figure 11:
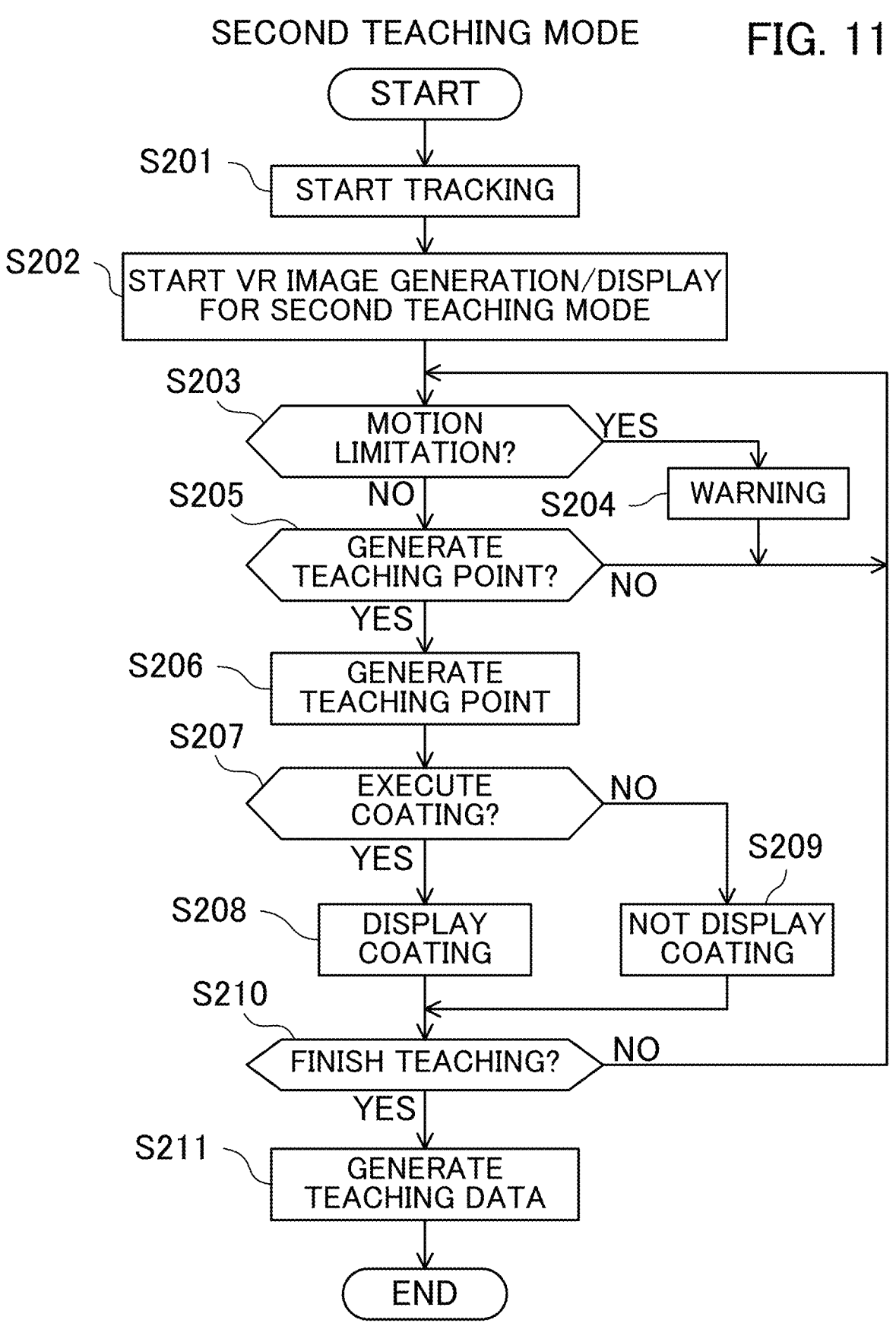
FIG. 11 is a flowchart of a second teaching mode.
Figure 12:
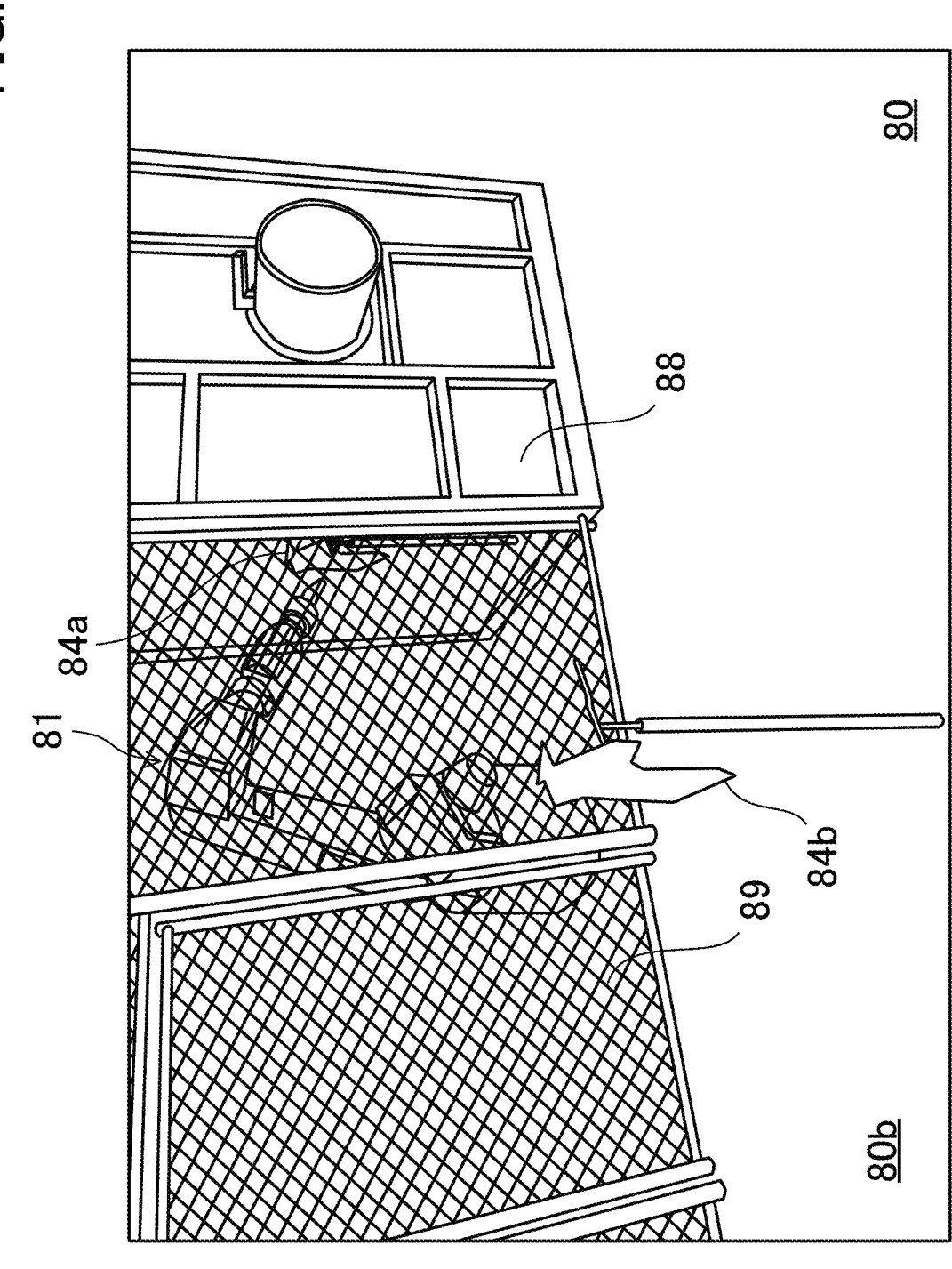
FIG. 12 is an example of a VR space in the second teaching mode.
Figure 13:
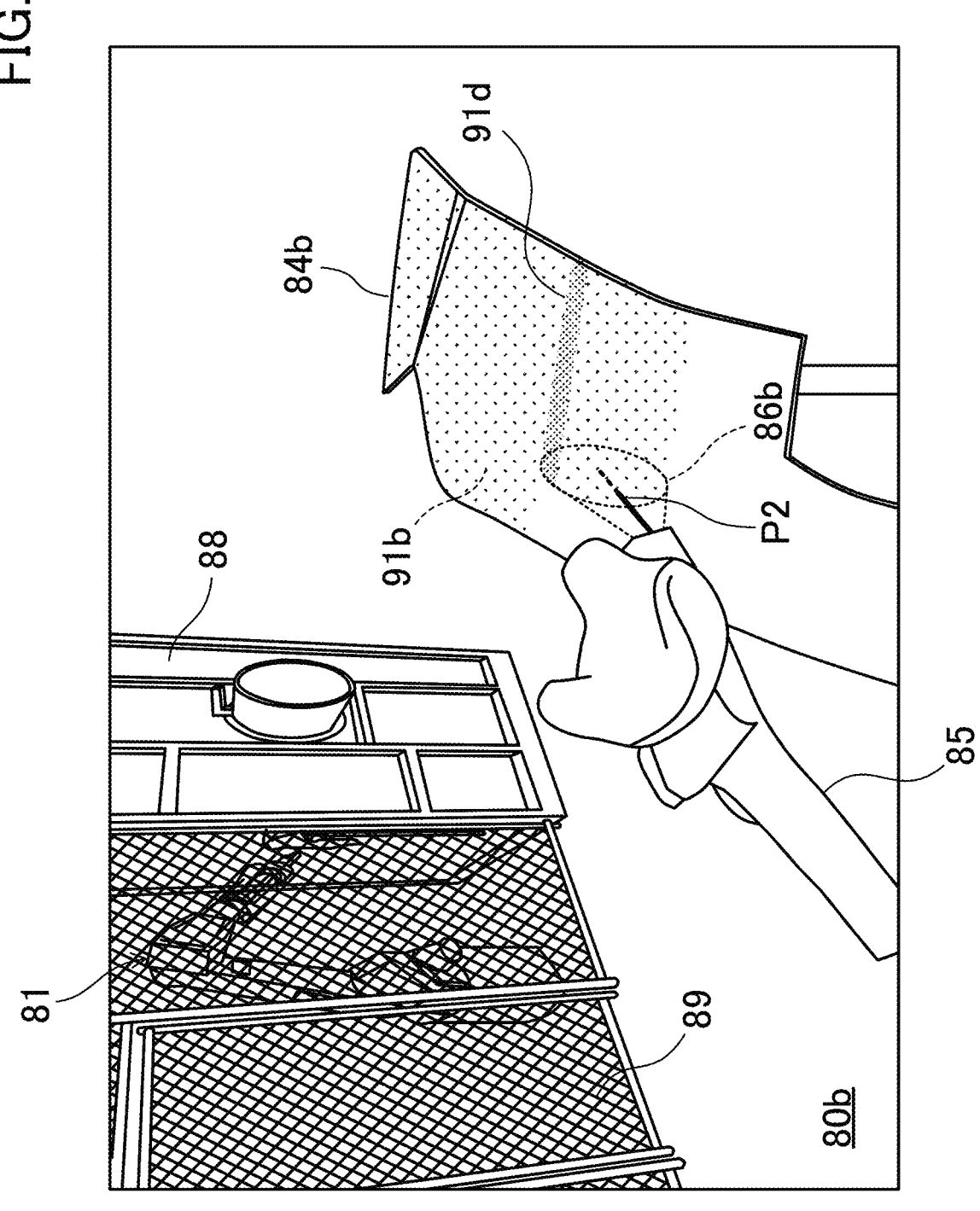
FIG. 13 is an example of a VR image in the second teaching mode.

Next, the second teaching mode will be described. FIG. 11 is a flowchart of the second teaching mode. FIG. 12 is an example of the VR space 80 in the second teaching mode. FIG. 13 is an example of the VR image 8 in the second teaching mode.

When teaching work in the second teaching mode starts, the tracking system 6 starts tracking in step S201. Specifically, the tracking system 6 starts detection and tracking of the positions and postures of the operator 3 and the display 5 in the real space.

After the start of tracking by the tracking system 6, the image generator 4 generates the VR image 8 in step S202. The display 5 displays the generated VR image 8. In the second teaching mode, the image generator 4 generates the VR image 8 seen from the user in the second region 80b.

Specifically, the image generator 45 reads the field definition data 42b and the object definition data 42c from the storage 42 and generates the VR space 80, the virtual robot 81, and other objects. In the second teaching mode, as illustrated in FIG. 12, the second virtual workpiece 84b is placed in the second region 80b.

The motion generator 46 generates a motion of the virtual robot 81 in accordance with the position and posture of the operator 3. At this time, the image generator 45 and the motion generator 46 convert the positions and postures of the operator 3 and the display 5 in the operation coordinate system of the tracking system 6 to the positions and postures in the VR coordinate system of the VR space 80 by using the second correspondence for the second teaching mode. The image generator 45 causes the virtual robot 81 to perform the motion generated by the motion generator 46 and generates the VR image 8 in the line of sight in accordance with the position and posture of the display 5.

The user operates the operator 3 while seeing the VR image 8 displayed on the display 5 to thereby move the virtual robot 81 in the VR image 8. In the second teaching mode, as illustrated in FIG. 13, the user generates teaching points while performing coating on the second virtual workpiece 84*b* with the virtual operator 85 in the second region 80*b*. Since the user is located in the second region 80*b*, the user is capable of performing teaching work while observing the entire state of the virtual robot 81 at a position away from the virtual robot 81. The second teaching mode can also be referred to as a remote teaching mode.

In the second teaching mode, the user is located away from the virtual end effector 83 and the first virtual workpiece 84*a*. However, in the second teaching mode, in a manner similar to the first teaching mode, a relative positional relationship between the second virtual workpiece 84*b* and the virtual operator 85 also coincide with a relative positional relationship between the first virtual workpiece 84*a* and the virtual end effector 83. Thus, the user observes the relative positional relationship between the second virtual workpiece 84*b* and the virtual operator 85 to thereby substantially observe the relative positional relationship between the first virtual workpiece 84*a* and the virtual end effector 83. That is, in the second teaching mode, the user can generate teaching points while observing an entire motion of the virtual robot 81 and also substantially observing a motion of the virtual end effector 83.

Step S202 corresponds to generating a virtual image in which a virtual robot corresponding to a robot is placed in a virtual space, displaying the virtual image, and moving the virtual robot in the virtual image in accordance with operation from a user to an operator for moving the virtual robot.

Processes in step S203 and subsequent steps in the second teaching mode are basically the same as processes in step S103 and subsequent steps in the first teaching mode. It should be noted that since the user is located away from the virtual end effector 83, display of the first virtual injection axis P1, the first virtual paint 86*a*, the first coating film 91*a*, the overlapping portion 91*c*, the virtual teaching points 92, and the trajectory 93 may be omitted.

Figure 14:
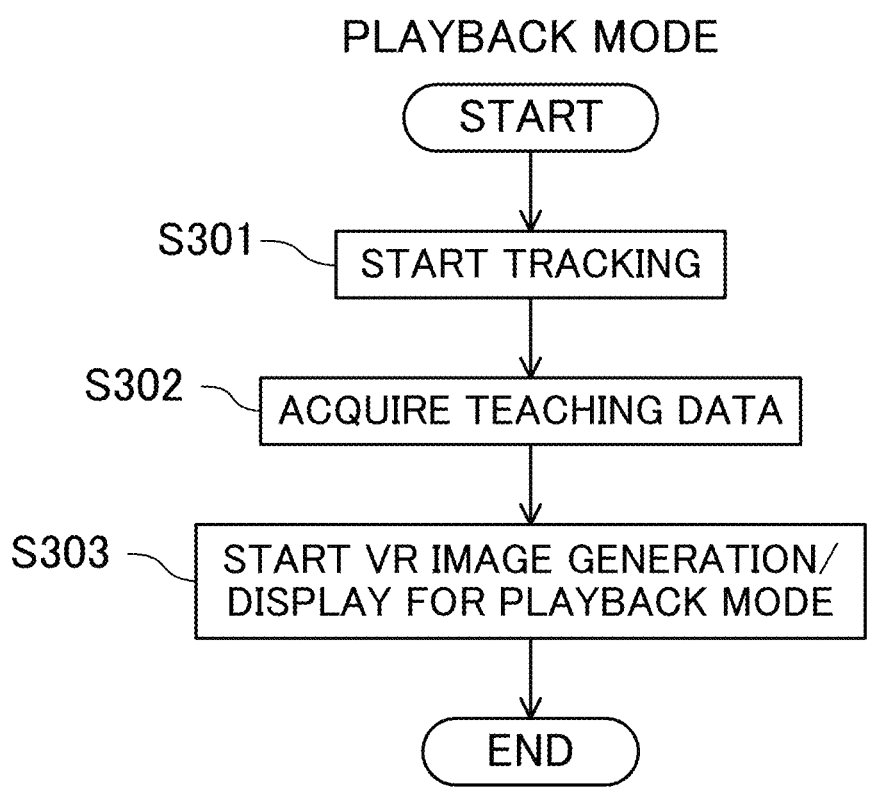
FIG. 14 is a flowchart of a playback mode.

The image generator 4 of the teaching system 100 also includes a playback mode of displaying the VR image 8 in which the virtual robot 81 moves in accordance with teaching points. Switching to the playback mode is performed by the user through the inputter 41, for example. The playback mode is performed in the case of checking teaching data, for example. In the playback mode, neither generation of teaching points nor generation of teaching data is performed. For example, the playback mode is performed in a state where the display 5 is mounted on the head of the user. FIG. 14 is a flowchart of the playback mode.

When teaching work in the playback mode starts, the tracking system 6 starts tracking in step S301. At this time, the tracking system 6 starts detection and tracking of the position and posture of the display 5 in the real space. Unlike the first teaching mode and the second teaching mode, the tracking system 6 does not perform detection and tracking of the position and posture of the operator 3.

In step S302, the image generator 4 acquires teaching data from the storage 21 of the teaching point generator 2.

Then, in step S303, the image generator 4 generates the VR image 8. The display 5 displays the generated VR image 8. Specifically, the image generator 45 reads the field definition data and the object definition data from the storage 42 and generates the VR space 80, the virtual robot 81, and other objects. In the playback mode, none of the second virtual workpiece 84*b* and the virtual operator 85 is generated. The motion generator 46 moves the virtual robot 81 in accordance with the teaching data. The image generator 45 basically generates the VR image 8 seen from the user in the second region 80*b*. Specifically, the image generator 45 converts the position and posture of the display 5 in the operation coordinate system of the tracking system 6 to the position and posture in the VR coordinate system of the VR space 80 by using the second correspondence for the second teaching mode. The image generator 45 generates the VR image 8 in the line of sight in accordance with the position and posture of the display 5.

In the playback mode, the VR image 8 in which the entire virtual robot 81 is included in the angle of view tends to be generated. The user can check teaching data by observing a motion of the virtual robot 81 displayed on the display 5. In the playback mode, the display 5 is also tracked and the VR image 8 in accordance with the position and posture of the display 5 is also generated, and thus, the user can observe a motion of the virtual robot 81 from a desired position and a desired angle.

In the playback mode, the virtual facilities and other objects can be in a non-display state in order to ease observation of the motion of the virtual robot 81. For example, the virtual booth 88, the virtual fence 89, and other objects may be in a non-display state. Display and non-display of objects and others can be set by the user through the inputter 41.

The position of the user in the playback mode is changeable. For example, the image generator 4 may generate the VR image 8 from the position of the user similar to the first teaching mode. Specifically, the image generator 45 converts the position and posture of the display 5 in the operation coordinate system of the tracking system 6 to the position and posture in the VR coordinate system of the VR space 80 by using the first correspondence for the first teaching mode. Alternatively, the image generator 45 may convert the position and posture of the display 5 in the operation coordinate system of the tracking system 6 to the position and posture in the VR coordinate system of the VR space 80 by using a correspondence dedicated to the playback mode different from the first teaching mode and the second teaching mode.

The motion speed of the virtual robot 81 in the playback mode may be changeable. The motion speed of the virtual robot 81 in the playback mode may be changeable to a normal speed that is a speed of the robot 1 actually moving in accordance with teaching data, a speed higher than the normal speed (i.e., high speed), and a speed lower than the normal speed (i.e., low speed).

In the thus-configured teaching system 100, since the first virtual workpiece 84*a* to be subjected to a treatment by the virtual end effector 83 is displayed in the VR image 8, the user can generate teaching points while observing a relative positional relationship between the virtual end effector 83 and the first virtual workpiece 84*a*. Unlike a case where the user generates teaching points while observing a motion of the robot 1 in the real space, the user generates teaching points while observing the VR image 8 of the display 5, and thus, does not need to consider interference between the actual robot 1 and the user. Thus, the user can easily judge whether the position and motion of the robot 1 are appropriate or not in generating teaching points. For example, in a case where the treatment of the robot 1 is a treatment of injecting an injection object to the workpiece W, the distance from the injection port 16 to the workpiece W and the orientation (i.e., injection direction) of the injection port 16 with respect to the workpiece W can affect quality of the treatment in some cases. In a case where the surface of the workpiece W is not flat, the influence of the distance from the injection port 16 and the orientation of the injection port 16 is especially large. In the teaching system 100, the distance from the first virtual injection port 83*a* of the virtual end effector 83 to the workpiece W and the orientation of the first virtual injection port 83*a* can be easily observed in the VR image 8.

In addition, in the VR image 8, the virtual end effector 83 performs a treatment, that is, coating, on the first virtual workpiece 84*a*. Accordingly, the user can generate teaching points while observing a situation of the treatment by the virtual end effector 83.

Specifically, the first coating film 91*a* is located on a portion of the first virtual workpiece 84*a* subjected coating. Accordingly, the user can generate teaching points while preventing occurrent of a non-treatment portion. In addition, the overlapping portion 91*c* of the first coating film 91*a* is displayed to be distinguishable from the other portion. Accordingly, the user can generate teaching points to reduce unevenness of the treatment.

Further, in the VR image 8, the first virtual paint 86*a* as an injection object from the virtual end effector 83 is displayed. By displaying the first virtual paint 86*a*, the user easily determines whether the relative positional relationship between the virtual end effector 83 and the first virtual workpiece 84*a* is appropriate or not. This is effective especially for a treatment performed with the virtual end effector 83 and the first virtual workpiece 84*a* being not in contact with each other, such as coating.

Since the second virtual paint 86*b* is also injected from the virtual operator 85 and coating is performed on the second virtual workpiece 84*b*, the user can determine the state of the virtual end effector 83 and the first virtual workpiece 84*a* without seeing the virtual end effector 83 and the first virtual workpiece 84*a*. In a case where the user is located away from the first virtual workpiece 84*a* and the virtual end effector 83, as in the second teaching mode, coating of the second virtual workpiece 84*b* by the virtual operator 85 is especially effective. Even in the first teaching mode, if the second virtual workpiece 84*b* is away from the first virtual workpiece 84*a*, coating of the second virtual workpiece 84*b* by the virtual operator 85 is effective.

In the VR image 8, virtual facilities corresponding to facilities around the robot 1 are displayed. Specifically, the virtual supporter 87 and other objects are displayed in the VR image 8. The user generates teaching points to prevent interference between the virtual robot 81 and virtual facilities to thereby avoid interference between the robot 1 and surrounding facilities in the real space.

In addition, the image generator 4 sets motion limitation on the motion range of the virtual robot 81, and if the virtual robot 81 reaches the motion limitation, the image generator 4 issues notification thereof, that is, warning. In the VR image 8, the virtual robot 81 can be freely moved unlike the real space. The virtual robot 81 can even perform motions that are impossible for the robot 1 in the real space. Thus, by setting motion limitation on the motion range of the virtual robot 81, it is possible to prevent the virtual robot 81 from performing motion that are impossible for the robot 1 in the real space.

The virtual robot 81 performs motion synchronized with operation of the operator 3 in the real space. That is, operation of the operator 3 in the real space is tracked by the tracking system 6. Based on the tracking result of the operator 3, the virtual end effector 83 is moved in synchronization with operation of the operator 3. Thus, the user can operate the virtual end effector 83 with a sense similar to moving the user's own hand. Accordingly, the user can generate teaching points while precisely moving the virtual end effector 83 as intended. For example, in the case of teaching using a teaching pendant, operation of the teaching pendant requires proficiency. On the other hand, by moving the virtual robot 81 in synchronization with operation of the operator 3 in the real space, instruction of teaching points can be intuitively performed, and no high-level proficiency is required. As a result, teaching points can be easily generated.

In this example, the virtual operator 85 is also displayed in the VR image 8. Since the virtual operator 85 corresponding to the operator 3 operated by the user is displayed in the VR image 8, the sense of hand matches with the sense of sight, and thus, the operator 3, and also, the virtual end effector 83, can be easily operated.

In the VR image 8 in the first teaching mode, the virtual operator 85 is located at a position offset from the virtual robot 81 by a predetermined amount. Specifically, since the virtual end effector 83 is located at a position shifted from the virtual operator 85, the user easily observes the state of the virtual end effector 83.

In addition, in the VR image 8, the second virtual workpiece 84*b* corresponding to the virtual operator 85 is displayed, and a relative positional relationship between the virtual operator 85 and the second virtual workpiece 84*b* coincides with a relative positional relationship between the virtual end effector 83 and the first virtual workpiece 84*a*. Thus, when the virtual operator 85 applies coating on the second virtual workpiece 84*b*, the virtual end effector 83 applies coating on the same position of the first virtual paint 86*a* as the coating position of the second virtual workpiece 84*b*. That is, when the user performs coating on the second virtual workpiece 84*b* while seeing the virtual operator 85 and the second virtual workpiece 84*b* in the VR image 8, the virtual end effector 83 performs coating on the first virtual workpiece 84*a* in the same manner. The user can generate teaching points while seeing the virtual operator 85 and the second virtual workpiece 84*b* without seeing the virtual end effector 83. On the other hand, the user can see the virtual end effector 83 while performing coating on the second virtual workpiece 84*b* with the virtual operator 85, thereby enabling observation of the situation of the virtual end effector 83. In this manner, the user can observe the situation of the virtual end effector 83 from an angle different from the virtual operator 85.

In the VR image 8, the virtual teaching points 92 corresponding to generated teaching points is displayed. Accordingly, the user can generate teaching points while observing the generated teaching points in the VR image 8. In addition, in the VR image 8, virtual teaching points 92 arranged in chronological order are also displayed. With this display, the user can imagine a trajectory of the virtual end effector 83 from the virtual teaching points 92. That is, the user can generate teaching points while imagining the trajectory of the virtual end effector 83. More specifically, in the VR image 8, a finite number of immediately preceding virtual teaching points 92 are displayed. That is, old teaching points that are not particularly helpful in forming a future trajectory of the virtual end effector 83 are not displayed. Accordingly, only a useful number of virtual teaching points 92 are displayed in the VR image 8 so that display of the VR image 8 can be thereby simplified.

Other Embodiments

In the foregoing section, the embodiment has been described as an example of the technique disclosed in the present application. The technique disclosed here, however, is not limited to these examples, and is applicable to other embodiments obtained by changes, replacements, additions, and/or omissions as necessary. Components described in the above embodiment may be combined as a new exemplary embodiment. Components provided in the accompanying drawings and the detailed description can include components unnecessary for solving problems as well as components necessary for solving problems in order to exemplify the technique. Therefore, it should not be concluded that such unnecessary components are necessary only because these unnecessary components are included in the accompanying drawings or the detailed description.

The robot 1 is not limited to an industrial robot and may be a medical robot. The treatment performed by the robot 1 is not limited to coating, and may be welding, cleaning, or shot blasting, for example. The treatment performed by the robot 1 may also be a treatment such as cutting or polishing, a treatment such as conveyance of a workpiece, or a treatment such as inspection of a workpiece. The injection object injected by the robot 1 is not limited to paint, and may be ink, a cleaning solution, water, a filler metal, a polishing agent (e.g., short material), a sealing material, a laser, flame, ultrasonic waves, electromagnetism, and so forth. The inspection may be a treatment of inspecting appearance of a workpiece with a camera included in the end effector 12.

The robot arm 11 may have redundancy. That is, there are multiple shapes (i.e., joint angles) of the robot arm 11 for placing the end effector 12 in a predetermined position and a predetermined posture, and the shape of the robot arm 11 does not need to be uniquely determined. In this case, the user may select joint angles of the robot arm 11 corresponding to generated teaching points from multiple patterns of joint angles, or the teaching point generator 2 may select the joint angles based on various conditions. For example, as the configuration in which the user selects the shape of the robot arm 11, the user may select, through the display 5, one of shapes of the robot arm 11 presented by the image generator 4.

The mechanism for changing the position and posture of the end effector 12 is not limited to the robot arm 11. The robot 1 may include another mechanism for changing the position and posture of the end effector 12 instead of the robot arm 11. The robot arm 11 is not limited to a vertical articulated type and may be of a horizontal articulated type, a parallel link type, a Cartesian coordinate type, a polar coordinate type, or other types.

The teaching point generator 2 may be one device or a set of devices. The teaching point generator 2 may not include the robot controller 26. That is, the teaching point generator 2 may not have the function of controlling the robot 1 based on teaching data.

Although the teaching point generator 2 receives the position and posture of the operator 3 in the operation coordinate system corresponding to virtual teaching points from the image generator 4 and generates teaching a point of the robot 1 from the received position and posture of the operator 3, the present disclosure is not limited to this example. The teaching point generator 2 may employ any method as long as the teaching point generator 2 generates a teaching point corresponding to a position of the virtual robot in the virtual space.

For example, the teaching point generator 2 may obtain the position and posture of the end effector 12 in the robot coordinate system from the detection result of the tracking system 6, receive a generation instruction of a teaching point from the operator 3 or through the image generator 4, and generate a teaching point from the position and posture of the end effector 12. That is, the teaching point generator 2 may have the function of the tracking controller 44. The teaching point generator 2 receives the detection result of the first sensor 62 of the tracking system 6 and the emission information of the light emitters 61, and based on the detection result of the first sensor 62 and the emission information of the light emitters 61, obtains the position and posture of the operator 3 in the operation coordinate system. The teaching point generator 2 converts the position and posture of the operator 3 in the operation coordinate system to the position and posture of the end effector 12 in the robot coordinate system. The teaching point generator 2 uses the position and posture of the end effector 12 when receiving a generation instruction of teaching points, as a teaching point.

Alternatively, the teaching point generator 2 may generate a teaching point by converting the position and posture of the virtual teaching point 92 generated by the image generator 4 in the VR coordinate system to the position and posture of a teaching point in the robot coordinate system.

Alternatively, the teaching point generator 2 may obtain the position and posture of the end effector 12 in the robot coordinate system from the detection result of the tracking system 6. The image generator 4 may convert the position and posture of the end effector 12 obtained by the teaching point generator 2 to the position and posture of the virtual end effector 83 in the VR coordinate system to generate the VR image 8 and generate virtual teaching points in accordance with an instruction from the user. Then, the teaching point generator 2 may receive a generation instruction of a teaching point through the operator 3 or the image generator 4 to use, as a teaching point, the position and posture of the end effector 12 when receiving the generation instruction of a teaching point.

That is, since the operation coordinate system, the robot coordinate system, and the VR coordinate system correspond to one another, the teaching point generator 2 may generate a teaching point in the robot coordinate system from the position and posture of the operator 3 in the operation coordinate system or may generate a teaching point in the robot coordinate system from the position and posture of the virtual teaching points 92, the virtual end effector 83, the virtual operator 85, or other objects in the VR coordinate system. In either case, the generated teaching point in the robot coordinate system corresponds to a position of the virtual robot in the virtual space.

It is sufficient that the robot coordinate system, the operation coordinate system, and the VR coordinate system correspond to one another, and the scales of these coordinate systems do not need to be identical. That is, the image generator 4 may generate the VR image 8 with reference to a VR coordinate system with twice the scale of the robot coordinate system. It is sufficient that the robot coordinate system, the operation coordinate system, and the VR coordinate system correspond to one another, and left-right or up-down orientation may be inverted among these coordinate systems.

The teaching point generator 2 and the image generator 4 are configured as different hardware devices, but may be configured as a single device.

The image generator 4 may be a single device or may be a set of devices. The virtual image generated by the image generator 4 is not limited to the VR image, and may be an augmented reality (AR) image or a mixed reality (MR) image. A part or a whole of the virtual arm 82, the first virtual workpiece 84*a*, the second virtual workpiece 84*b*, the virtual operator 85, the first virtual paint 86*a*, the second virtual paint 86*b*, the virtual facilities, the first coating film 91*a*, the second coating film 91*b*, the virtual teaching points 92, and the trajectory 93 included in the virtual image may not be switchable between display and non-display. It is sufficient for the VR image 8 generated by the image generator 4 to include at least the virtual robot 81, and a part or a whole of the first virtual workpiece 84*a*, the second virtual workpiece 84*b*, the virtual operator 85, the first virtual paint 86*a*, the second virtual paint 86*b*, the virtual facilities, the first coating film 91*a*, the second coating film 91*b*, the virtual teaching points 92, and the trajectory 93 may be omitted.

It is sufficient for the image generator 4 to include only one or two of the first teaching mode, the second teaching mode, and the playback mode, and one or two of the first teaching mode, the second teaching mode, and the playback mode may be omitted. For example, the image generator 4 may include only the first teaching mode, may include only the second teaching mode, or may include only the playback mode, among the first teaching mode, the second teaching mode, and the playback mode.

It is sufficient that the robot coordinate system, the operation coordinate system, and the VR coordinate system correspond to one another, and the scales of these coordinate systems do not need to be identical. That is, the image generator 4 may generate the VR image 8 with reference to a VR coordinate system with twice the scale of the robot coordinate system. It is sufficient that the robot coordinate system, the operation coordinate system, and the VR coordinate system correspond to one another, and left-right or up-down orientation may be inverted among these coordinate systems.

The operator 3 may be, for example, a teaching pendant. The operation device 31 may be included in a device different from the operator 3. For example, the operation device 31 may be included in the display 5 or the image generator 4.

The operator sensor that detects the position and posture of the operator 3 in the real space is not limited to the tracking system 6. For example, the operator sensor may be a tracking system different from the tracking system 6. For example, the operator sensor may be a tracking system including a light-emitting tracking marker included in the operator 3 and a camera that takes stereo pictures of a real space where the user is present. For example, the tracking marker emits infrared rays. The camera is an infrared camera. Image data taken by the camera is transmitted to the image generator 4. The image generator 4 performs image processing on image data from the camera to thereby obtain the position and posture of the operator 3 in the real space. The tracking system may be any one of an outside-in type or an inside-out type.

The method for notifying the user that the virtual robot 81 has reached motion limitation is not limited to notification information included in the VR image 8. For example, notification to the user that the virtual robot 81 has reached motion limitation may be sound, vibrations, or other means generated by a device such as the display 5 or the operator 3.

In this example, a teaching point is generated at every operation of the generation switch 32 of the operator 3, but generation of teaching points is not limited to such generation that is intermittently performed. For example, generation of teaching points may be continuously performed in a period from a generation start time to a generation end time determined in accordance with operation of the operator 3. In this example, for example, points on a movement trajectory of the virtual operator 85 that moves in the virtual space 80 are generated as teaching points.

An instruction for generating teaching data is not limited to an end instruction. An instruction for generating teaching data may be input to the teaching data generator 25 by user's operation of the operator 3, the display 5, the inputter 41 of the image generator 4, or the inputter of the teaching point generator 2. The teaching data may include a set of joints 14 for complementing movement of the end effector 12 between one teaching point and the next teaching point. The rotation angles of the joints 14 may not be rotation angles themselves, but may be values related to rotation angles. For example, the rotation angles of the joints 14 may be rotation angles of the motors 15.

The display of posture of the virtual end effector 83 and the display of distance from the virtual end effector 83 described above are merely examples. For example, with respect to the posture of the virtual end effector 83, the angle of the first virtual injection axis P1 in the virtual coordinate system or the angle of the first virtual injection axis P1 to the normal of the first virtual workpiece 84*a* may be displayed as a numerical value in the VR image 8. With respect to the posture of the virtual end effector 83, the first virtual paint 86*a* may be classified by colors in accordance with the distance from the virtual end effector 83. That is, the color of the first virtual paint 86*a* may represent the distance from the virtual end effector 83. Alternatively, the distance from the virtual end effector 83 may be displayed by a numerical value in the VR image 8. The distance from the virtual end effector 83 to the workpiece W may be displayed.

The display 5 is not limited to an HMD. For example, the display 5 may be a general display.

The function of moving the robot 1 in the teaching system 100 is not essential. That is, the teaching point generator 2 may not include the robot controller 26.

The teaching system 100 may not include the function of generating teaching points, and may generate a virtual image in which the virtual robot moves in accordance with teaching points and display the virtual image. That is, the teaching system includes a teaching point generator that generates a teaching point of a robot, an image generator that generates a virtual image in which a virtual robot corresponding to the robot is placed in a virtual space, and a display that displays the virtual image, and the image generator generates the virtual image in which the virtual robot moves in accordance with the teaching point generated by the teaching point generator. In this case, the teaching point generator simply generates the input teaching point, and the image generator generates the virtual image in which the virtual robot moves in accordance with the teaching point generated by the teaching point generator. This teaching system enables the user to determine whether the teaching point is appropriate or not while seeing a motion of the virtual robot.

Data such as the field definition data 42*b* and the object definition data 42*c* is not limited to data crated based on actual design data of the robot 1 and other components or actually measured values of the robot 1 and other components. For examples, the data such as the field definition data 42*b* and the object definition data 42*c* may be created by using simulation software such as an offline programing tool or offline teaching software. With a computer installed with simulation software, a teacher inputs numerical value information or other data through a user interface to thereby create data on a field and an object in a VR space (e.g., the field definition data 42*b*, the object definition data 42*c*, etc.). The simulation software may be obtained in such a manner that the computer performs the function of creating data on a field and an object by scanning the work field of, for example, a factory where the robot 1 is actually placed.

The teaching system 100 may output the generated teaching data to the outside. For example, the teaching system 100 may output teaching data to a computer installed with simulation software. The computer can display teaching data by the function of the simulation software.

Functions of elements disclosed herein may be performed by using a circuit or a processing circuit including a general-purpose processor, a dedicated processor, an integrated circuit, an application specific integrated circuit (ASIC) configured or programmed to perform disclosed functions, a conventional circuit, and/or a combination thereof. A processor includes a transistor and other circuits, and thus, are assumed to be a processing circuit or a circuit. In the present disclosure, a circuit, a unit, or a means is hardware that performs listed functions, or hardware programmed to perform listed functions. The hardware may be the hardware disclosed herein, or known hardware programmed or configured to perform listed functions. If the hardware is a processor considered as a type of a circuit, the circuit, the means, or the unit is a combination of hardware and software, and software is used for a configuration of hardware and/or a processor.

The techniques of the present disclosure described above are summarized as follows.

[1] The teaching system 100 includes: the teaching point generator 2 that generates a teaching point of the robot 1; the operator 3 that is operated by a user; the image generator 4 that generates a VR image 8 (virtual image) in which the virtual robot 81 corresponding to the robot 1 is placed in the VR space 80 (virtual space); and the display 5 that displays the VR image 8, the image generator 4 generates the VR image 8 in which the virtual robot 81 moves in accordance with operation to the operator 3, and the teaching point generator 2 generates a teaching point corresponding to a position of the virtual robot 81 in the VR space 80 generated by the image generator 4.

With this configuration, the user operates the operator 3 while seeing the VR image 8 displayed on the display 5 to thereby move the virtual robot 81 in the VR space 80. Then, the user can generate a teaching point while moving the virtual robot 81 in the VR space 80. In this case, since the VR image 8 is used, the user can observe a motion of the virtual robot 81 from various viewpoints such as a viewpoint close to the virtual robot 81 and a viewpoint away from the virtual robot 81. For example, the user can observe a motion of the virtual robot 81 and other movement from a position close to the virtual robot 81, that is, within the motion range of the robot 1, that cannot be achieved in the real space. Accordingly, the user can generate a teaching point appropriately.

[2] In the teaching system 100 of [1], the image generator 4 places, in the VR space 80, the first virtual workpiece 84*a* (virtual workpiece) corresponding to the workpiece W on which the robot 1 performs a treatment.

With this configuration, since the first virtual workpiece 84*a* is displayed in addition to the virtual robot 81 in the VR image 8, the user can generate a teaching point while observing a relative positional relationship between the virtual robot 81 and the first virtual workpiece 84*a*.

[3] In the teaching system 100 of [1] or [2], the image generator 4 causes the virtual robot 81 to perform a treatment on the first virtual workpiece 84*a* in accordance with operation to the operator 3.

This configuration enables the user to generate a teaching point while determining whether a treatment on the first virtual workpiece 84*a* by the virtual robot 81 is appropriately performed or not. As a result, a teaching point can be appropriately generated.

[4] In the teaching system 100 of any one of [1] to [3], the robot 1 includes the articulated robot arm 11 and the end effector 12 coupled to the robot arm 11, the image generator 4 places, the VR space 80, the virtual arm 82 corresponding to the robot arm 11 and the virtual end effector 83 corresponding to the end effector 12, and the teaching point generator 2 generates, as the teaching point, a position and a posture of the end effector 12 in the real space corresponding to a position and a posture of the virtual end effector 83 in the VR space 80.

In this configuration, the robot 1 includes the robot arm 11 and the end effector 12. Then, based on the virtual end effector 83, the position and posture of the end effector 12 are generated as a teaching point. The end effector 12 is a part of the robot 1 that applies a treatment on a workpiece. By generating the position and posture of the end effector 12 as a teaching point, a motion of the robot 1 can be appropriately defined by using the teaching point.

[5] In the teaching system 100 of any one of [1] to [4], the image generator 4 switches display of the virtual arm 82 in the VR image 8 between display and non-display.

With this configuration, the user can easily observe a motion of the virtual end effector 83 by setting the virtual arm 82 in a non-display state, for example. On the other hand, the user can also observe a motion of the virtual arm 82 in addition to the virtual end effector 83 by displaying the virtual arm 82.

[6] In the teaching system 100 of any one of [1] to [5], the image generator 4 places, in the VR space 80, the virtual supporter 87, the virtual booth 88, or the virtual fence 89 (virtual facility) corresponding to facilities around the robot 1.

With this configuration, the user can generate teaching points while avoiding interference between the virtual robot 81 and virtual facilities.

[7] In the teaching system 100 of any one of [1] to [6], the image generator 4 generates the VR image 8 seen from the user in the movable range of the virtual robot 81.

With this configuration, a situation seen from a position at which the user and the robot 1 would interfere with each other in the real space can be replicated by the VR image 8. Accordingly, the user can generate teaching points while observing the virtual end effector 83 and other objects from an angle at which the user would not observe in the real space.

[8] The teaching system 100 of any one of [1] to [7] further includes the tracking system 6 (operator sensor) that detects a position and a posture of the operator 3 in a real space, and the image generator 4 causes the virtual robot 81 to perform a motion in the VR space 80 in synchronization with operation of the operator 3 in the real space based on a detection result of the tracking system 6.

With this configuration, since the virtual robot 81 moves in synchronization with operation of the operator 3 in the real space, the user can move the virtual robot 81 with the same sense as the sense in operating the operator 3. For example, in the case of teaching using a teaching pendant, operation of the teaching pendant requires proficiency. On the other hand, by moving the virtual robot 81 in synchronization with operation of the operator 3 in the real space, instruction of teaching points can be intuitively performed, and no high-level proficiency is required. As a result, teaching points can be easily generated.

[9] In the teaching system 100 of any one of [1] to [8], the image generator 4 places the virtual operator 85 corresponding to the operator 3 in the VR space 80 based on the detection result of the tracking system 6.

With this configuration, since the virtual operator 85 corresponding to the operator 3 operated by the user in the real space is displayed in the VR image 8, the sense of operation of the user coincides with the sense of sight, and thus, the user can operate the operator 3 without incongruity sense.

[10] In the teaching system 100 of any one of [1] to [9], the image generator 4 places the virtual operator 85 in the VR space 80 at a position offset from the virtual robot 81 by a predetermined amount.

With this configuration, in the VR image 8, the virtual robot 81 is placed at a position away from the virtual operator 85 operated by the user by a given distance. As compared to a case where the virtual robot 81 is excessively close to the user, it becomes easier to observe a motion of the virtual robot 81 when the virtual robot 81 is even slightly away from the user.

[11] In the teaching system 100 of any one of [1] to [10], the image generator 4 places the virtual teaching point 92 corresponding to the teaching point in the VR space 80.

With this configuration, the user can observe the generated teaching point in the VR image 8.

[12] In the teaching system 100 of any one of [1] to [11], the image generator 4 places a predetermined number of immediately preceding virtual teaching points 92 in the VR space 80.

With this configuration, the user easily imagines a trajectory of the virtual robot 81 from a predetermined number of immediately preceding virtual teaching points 92. By limiting the number of virtual teaching points 92 to be displayed to a predetermined number of immediately preceding virtual teaching points 92, it is possible to prevent complexity of the VR image 8.

[13] In the teaching system 100 of [1] to [12], the image generator 4 sets a motion limitation on a motion range of the virtual robot 81, and when the virtual robot 81 reaches the motion limitation, the image generator 4 notifies that the virtual robot 81 reaches the motion limitation.

With this configuration, the user sets a limitation on a motion of the virtual robot 81 even in the VR space 80 to thereby prevent generation of a teaching point in a range where the robot 1 cannot move in the real space.

[14] In the teaching system 100 of any one of [1] to [13], the image generator 4 has the playback mode of displaying the VR image 8 in which the virtual robot 81 moves in accordance with the teaching point generated by the teaching point generator 2.

With this configuration, the user can observe a motion of the virtual robot 81 in accordance with the generated teaching point so that the user can easily determine whether the generated teaching point is appropriate or not.

[15] The teaching system 100 includes: the teaching point generator 2 that generates a teaching point of the robot 1; the image generator 4 that generates the VR image 8 in which the virtual robot 81 corresponding to the robot 1 is placed in the VR space 80; and the display 5 that displays the VR image 8, and the image generator 4 generates the VR image 8 in which the virtual robot 81 moves in accordance with the teaching point generated by the teaching point generator 2.

With this configuration, the user can observe a motion of the robot 1 in accordance with the teaching point by seeing the VR image 8 in which the virtual robot 81 moves. In this case, the user can observe a motion or other movement of the virtual robot 81 from various viewpoints such as a position close to the virtual robot 81, for example.

[16] The robot system 1000 includes: the teaching system 100 of any one of [1] to [15]; and the robot 1 that moves in accordance with the teaching point generated by the teaching point generator 2.

With this configuration, the user can move the virtual robot 81 in the VR space 80 by operating the operator 3 while seeing the VR image 8 displayed on the display 5. Then, the user can generate a teaching point while moving the virtual robot 81 in the VR space 80. In this case, since the VR image 8 is used, the user can observe a motion of the virtual robot 81 from various viewpoints such as a viewpoint close to the virtual robot 81 and a viewpoint away from the virtual robot 81. For example, the user can observe a motion of the virtual robot 81 and other movement from a position close to the virtual robot 81, that is, within the motion range of the robot 1, that cannot be achieved in the real space. Accordingly, the user can generate a teaching point appropriately.

[17] A teaching method for the robot 1 includes: generating the VR image 8 in which the virtual robot 81 corresponding to the robot 1 is placed in the VR space 80; displaying the VR image 8; moving the virtual robot 81 in the VR image 8 in accordance with operation from a user to the operator 3 for moving the virtual robot 81; and generating a teaching point of the robot 1 corresponding to a position of the virtual robot 81 in the VR space 80.

With this configuration, the user can move the virtual robot 81 in the VR space 80 by operating the operator 3 while seeing the displayed VR image 8. Then, the user can generate teaching points while moving the virtual robot 81 in the VR space 80. In this case, since the VR image 8 is used, the user can observe a motion of the virtual robot 81 from various viewpoints such as a viewpoint close to the virtual robot 81 and a viewpoint away from the virtual robot 81. For example, the user can observe a motion of the virtual robot 81 and other movement from a position close to the virtual robot 81, that is, within the motion range of the robot 1, that cannot be achieved in the real space. Accordingly, the user can generate teaching points appropriately.

[18] The teaching program 42a for the robot 1 causes a computer to perform the functions of: generating the virtual image 8 in which the virtual robot 81 corresponding to the robot 1 is placed in the VR space 80; moving the virtual robot 81 in the VR image 8 in accordance with operation from a user to the operator 3 for moving the virtual robot 81; and generating a teaching point of the robot 1 corresponding to a position of the virtual robot 81 in the VR space 80.

With this configuration, the user can move the virtual robot 81 in the VR space 80 by operating the operator 3 while seeing the VR image 8. Then, the user can generate teaching points while moving the virtual robot 81 in the VR space 80. In this case, since the VR image 8 is used, the user can observe a motion of the virtual robot 81 from various viewpoints such as a viewpoint close to the virtual robot 81 and a viewpoint away from the virtual robot 81. For example, the user can observe a motion of the virtual robot 81 and other movement from a position close to the virtual robot 81, that is, within the motion range of the robot 1, that cannot be achieved in the real space. Accordingly, the user can generate a teaching point appropriately.

DESCRIPTION OF REFERENCE CHARACTERS

1000 robot system
100 teaching system
1 robot
11 robot arm
12 end effector
14 joint
2 teaching point generator
3 operator
4 image generator
42a teaching program
5 display
6 tracking system (operator sensor)
8 VR image (virtual image)
80 VR space (virtual space)
81 virtual robot
82 virtual arm
83 virtual end effector
84a first virtual workpiece (virtual workpiece)
85 virtual operator
87 virtual supporter (virtual facility)
88 virtual booth (virtual facility)
89 virtual fence (virtual facility)
The invention claimed is:

1. A teaching system comprising:
a teaching point generator that generates a teaching point of a robot;
an operator that is operated by a user;
an image generator that generates a virtual image in which a virtual robot corresponding to the robot is placed in a virtual space;
a display that displays the virtual image; and
a tracking system that detects a position and an orientation of the operator in a real space and a position and a direction of a line of sight of the user in the real space, wherein
the virtual robot moves in accordance with an operation of the operator,
the image generator generates the virtual image in synchronization with the position and the direction of the line of sight of the user in the real space detected by the tracking system, and
the teaching point generator generates the teaching point corresponding to a position of the virtual robot in the virtual space generated by the image generator.

2. The teaching system according to claim 1, wherein the image generator places, in the virtual space, a virtual workpiece corresponding to a workpiece on which the robot performs a treatment.

3. The teaching system according to claim 2, wherein the image generator causes the virtual robot to perform a treatment on the virtual workpiece in accordance with the operation of the operator.

4. The teaching system according to claim 1, wherein the robot includes an articulated robot arm and an end effector coupled to the robot arm, the image generator places, in the virtual space, a virtual arm corresponding to the robot arm and a virtual end effector corresponding to the end effector, and
the teaching point generator generates, as the teaching point, a position and a posture of the end effector in the real space corresponding to a position and a posture of the virtual end effector in the virtual space.

5. The teaching system according to claim 4, wherein the image generator switches display of the virtual arm in the virtual image between display and non-display.

6. The teaching system according to claim 1, wherein the image generator places, in the virtual space, a virtual facility corresponding to a facility around the robot.

7. The teaching system according to claim 1, wherein the image generator generates the virtual image seen from a user in a movable range of the virtual robot.

8. The teaching system according to claim 1, wherein the tracking system detects the position and the orientation of the operator in the real space, and
the image generator causes the virtual robot to perform a motion in the virtual space in synchronization with the operation of the operator in the real space based on a detection result of the tracking system.

9. The teaching system according to claim 8, wherein the image generator places a virtual operator corresponding to the operator in the virtual space based on the detection result of the tracking system.

10. The teaching system according to claim 9, wherein the image generator places the virtual operator in the virtual space at a position offset from the virtual robot by a predetermined amount.

11. The teaching system according to claim 1, wherein the image generator places a virtual teaching point corresponding to the teaching point in the virtual space.

12. The teaching system according to claim 11, wherein the image generator places a predetermined number of immediately preceding virtual teaching points in the virtual space.

13. The teaching system according to claim 1, wherein the image generator sets a motion limitation on a motion range of the virtual robot, and when the virtual robot reaches the motion limitation, the image generator notifies that the virtual robot reaches the motion limitation.

14. The teaching system according to claim 1, wherein the image generator has a playback mode of displaying the virtual image in which the virtual robot moves in accordance with the teaching point generated by the teaching point generator.

15. A robot system comprising:
the teaching system according to claim 1; and
a robot that moves in accordance with the teaching point generated by the teaching point generator.

16. The teaching system according to claim 1, wherein the operator includes a generation switch, and the teaching point generator generates, as the teaching point, a position of the virtual robot in the virtual space when the generation switch is operated by the user.

17. A teaching system comprising:
a teaching point generator that generates a teaching point of a robot;
an image generator that generates a virtual image in which a virtual robot corresponding to the robot is placed in a virtual space;
a display that displays the virtual image; and a tracking system that detects a position and an orientation of an operator in a real space and a position and a direction of a line of sight of a user in the real space, wherein the image generator generates the virtual image in which the virtual robot moves in accordance with the teaching point generated by the teaching point generator, and the image generator generates the virtual image in synchronization with the position and the direction of the line of sight of the user in the real space detected by the tracking system.

18. A teaching method for a robot, comprising:

generating a virtual image in which a virtual robot corresponding to the robot is placed in a virtual space;

displaying the virtual image;

moving the virtual robot in the virtual image in accordance with an operation from a user to an operator for moving the virtual robot;

detecting, by a tracking system, a position and an orientation of the operator in a real space and a position and a direction of a line of sight of the user in the real space;

generating the virtual image in synchronization with the position and the direction of the line of sight of the user in the real space detected by the tracking system; and generating a teaching point of the robot corresponding to a position of the virtual robot in the virtual space.

* * * * *